US012676701B2

(12) United States Patent
Kadiri et al.

(10) Patent No.: US 12,676,701 B2
(45) Date of Patent: Jul. 7, 2026

(54) MRB ARCHITECTURE WITH PDCP RETRANSMISSION

(71) Applicant: QUALCOMM Incorporated, San Diego, CA (US)

(72) Inventors: Prasad Reddy Kadiri, San Diego, CA (US); Ruiming Zheng, Beijing (CN); Alberto Rico Alvarino, San Diego, CA (US); Umesh Phuyal, San Diego, CA (US); Xipeng Zhu, San Diego, CA (US); Le Liu, San Jose, CA (US); Kazuki Takeda, Minato-ku (JP); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/006,557

(22) PCT Filed: Aug. 3, 2020

(86) PCT No.: PCT/CN2020/106510
§ 371 (c)(1),
(2) Date: Jan. 23, 2023

(87) PCT Pub. No.: WO2022/027162
PCT Pub. Date: Feb. 1, 2022

(65) Prior Publication Data
US 2023/0308221 A1     Sep. 28, 2023

(51) Int. Cl.
*H04L 1/1812* (2023.01)
*H04W 76/40* (2018.01)

(52) U.S. Cl.
CPC ........... *H04L 1/1816* (2013.01); *H04W 76/40* (2018.02)

(58) Field of Classification Search
CPC ........... H04L 1/1816; H04L 2001/0093; H04L 1/1685; H04L 1/1848; H04L 1/1874; H04W 76/40; H04W 28/02
See application file for complete search history.

(56) References Cited

U.S. PATENT DOCUMENTS

| | | | |
|---|---|---|---|
| 10,027,729 | B2 | 7/2018 | Cheng et al. |
| 10,251,155 | B2 | 4/2019 | Gupta et al. |
| (Continued) | | | |

FOREIGN PATENT DOCUMENTS

| | | |
|---|---|---|
| CN | 108353039 A | 7/2018 |
| CN | 109588059 A | 4/2019 |
| (Continued) | | |

OTHER PUBLICATIONS

Supplementary European Search Report—EP20948234—Search Authority—The Hague—Mar. 27, 2024 9 pages.
(Continued)

*Primary Examiner* — Hoang-Chuong Q Vu
(74) *Attorney, Agent, or Firm* — Dinsmore & Shohl LLP

(57) ABSTRACT

Embodiments include systems and methods for supporting for supporting retransmission in a multicast session in a Fifth Generation (5G) New Radio (NR) (5G NR) radio access network (RAN). Various embodiments may provide an enhanced multicast radio bearer (MRB) architecture leveraging Packet Data Convergence Protocol (PDCP) status reporting by wireless devices to a base station of a 5G NR RAN. Various embodiments may support multiple Radio Link Control (RLC) entities, also referred to as RLC legs, in a multicast session. One or more multicast RLC legs may be used for multicast and/or unicast transmission to wireless devices and a unicast RLC leg may be used for unicast transmission to a specific wireless device. Various
(Continued)

embodiments may enable PDCP level retransmission of PDCP protocol data units (PDUs).

22 Claims, 27 Drawing Sheets

(56) References Cited

U.S. PATENT DOCUMENTS

| | | | | |
|---|---|---|---|---|
| 12,245,324 | B2* | 3/2025 | Kim | H04W 76/19 |
| 2017/0064768 | A1* | 3/2017 | Lee | H04W 8/22 |
| 2018/0070325 | A1* | 3/2018 | Yi | H04L 1/1685 |
| 2018/0368196 | A1* | 12/2018 | Gage | H04L 63/0428 |
| 2019/0045577 | A1* | 2/2019 | Kim | H04W 76/19 |
| 2019/0150217 | A1 | 5/2019 | Kim | |
| 2019/0281655 | A1* | 9/2019 | Kim | H04L 1/1685 |
| 2019/0349810 | A1 | 11/2019 | Cho et al. | |
| 2019/0364462 | A1* | 11/2019 | Kim | H04W 36/00 |
| 2020/0059324 | A1* | 2/2020 | Martin | H04L 1/1685 |
| 2020/0100317 | A1* | 3/2020 | Jiang | H04L 5/0094 |
| 2020/0281043 | A1* | 9/2020 | Xu | H04W 88/04 |
| 2020/0323024 | A1* | 10/2020 | Huang | H04L 12/185 |
| 2021/0014924 | A1* | 1/2021 | Zheng | H04L 47/34 |
| 2021/0045029 | A1* | 2/2021 | Ryu | H04W 36/12 |
| 2021/0282050 | A1* | 9/2021 | Adjakple | H04L 1/1874 |
| 2021/0345177 | A1* | 11/2021 | Kanamarlapudi | H04L 1/1864 |
| 2022/0217506 | A1* | 7/2022 | Xu | H04W 74/0833 |
| 2022/0361060 | A1* | 11/2022 | Wallentin | H04W 36/00837 |
| 2023/0023919 | A1* | 1/2023 | Qi | H04W 72/30 |
| 2023/0262734 | A1* | 8/2023 | Qi | H04L 12/189 |
| | | | | 455/414.1 |
| 2023/0284101 | A1* | 9/2023 | Dai | H04W 36/0235 |
| | | | | 370/331 |

FOREIGN PATENT DOCUMENTS

| | | | |
|---|---|---|---|
| CN | 109982266 A | 7/2019 |
| CN | 109983747 A | 7/2019 |
| CN | 110546987 A | 12/2019 |
| CN | 111373837 A | 7/2020 |
| CN | 111480359 A | 7/2020 |
| WO | 2016191196 A1 | 12/2016 |
| WO | 2017120476 | 7/2017 |
| WO | 2018128452 A1 | 7/2018 |

OTHER PUBLICATIONS

Catt: "38.323 CR for NR V2X", 3GPP Draft, 3GPP TSG-RAN WG2 Meeting #110, R2-2005963 (Revision of R2-2004888), Electronic, Jun. 1-Jun. 12, 2020, 41 Pages, sections 5 and 6.

Huawei: "New Work Item on NR Support of Multicast and Broadcast Services", 3GPP Draft, 3GPP TSG RAN Meeting #86, RP-193248 (revision of RP-193163), Sitges, Spain, Dec. 9-12, 2019, 5 Pages.

International Search Report and Written Opinion—PCT/CN2020/106510—ISAEPO—Apr. 27, 2021.

Catt: "38.323 CR for NR V2X", 3GPP TSG-RAN WG2 Meeting #110, R2-2005963 (Revision of R2-2004888), Electronic, Jun. 1-Jun. 12, 2020, 41 Pages.

* cited by examiner

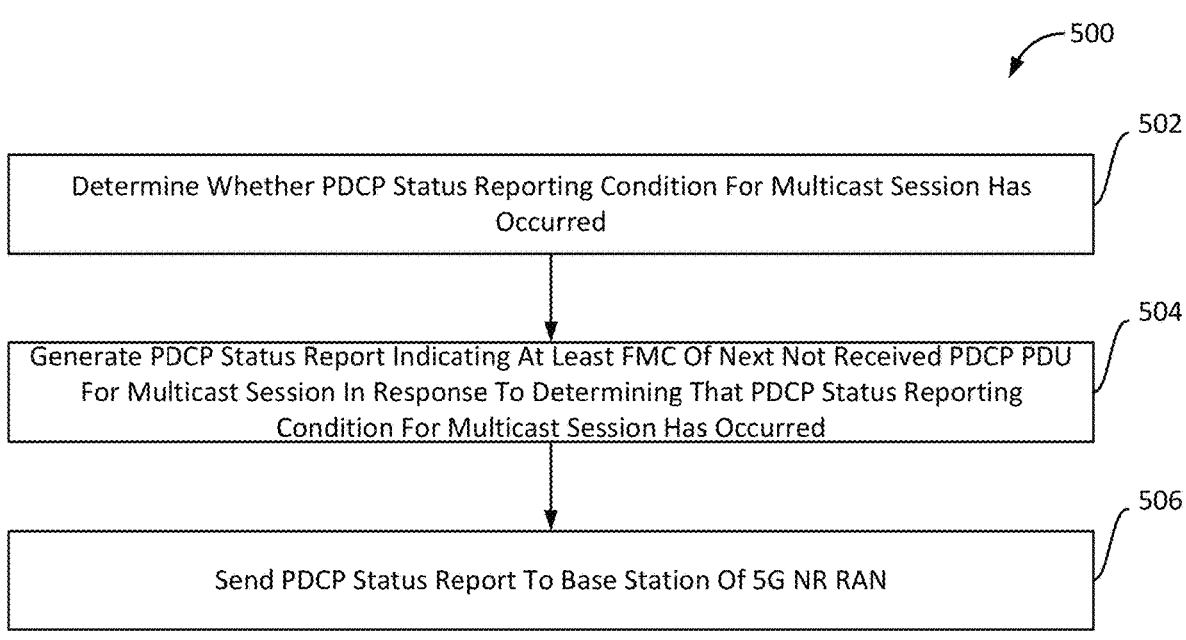

500

502

Determine Whether PDCP Status Reporting Condition For Multicast Session Has Occurred

504

Generate PDCP Status Report Indicating At Least FMC Of Next Not Received PDCP PDU For Multicast Session In Response To Determining That PDCP Status Reporting Condition For Multicast Session Has Occurred

506

Send PDCP Status Report To Base Station Of 5G NR RAN

FIG. 5A

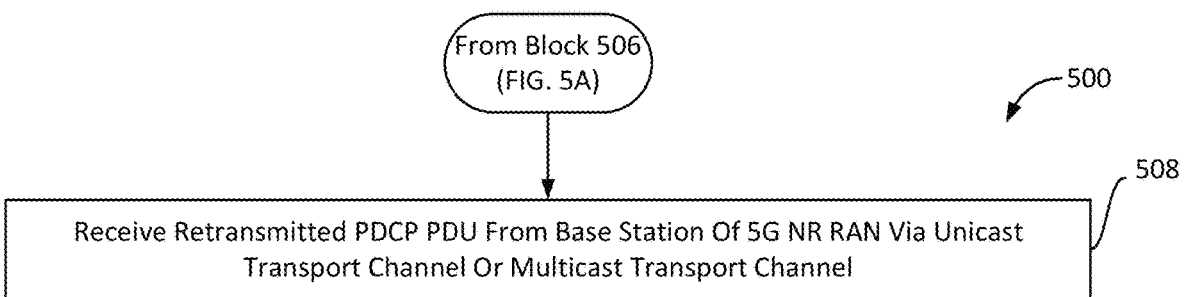

From Block 506 (FIG. 5A)

500

508

Receive Retransmitted PDCP PDU From Base Station Of 5G NR RAN Via Unicast Transport Channel Or Multicast Transport Channel

Receive Packet For Transport In Multicast Session At PDCP Layer

604

Store Copy Of Packet For Transport In Re-Transmission Buffer Of PDCP Layer

606

Add PDCP Header To Packet For Transport To Generate PDCP PDU

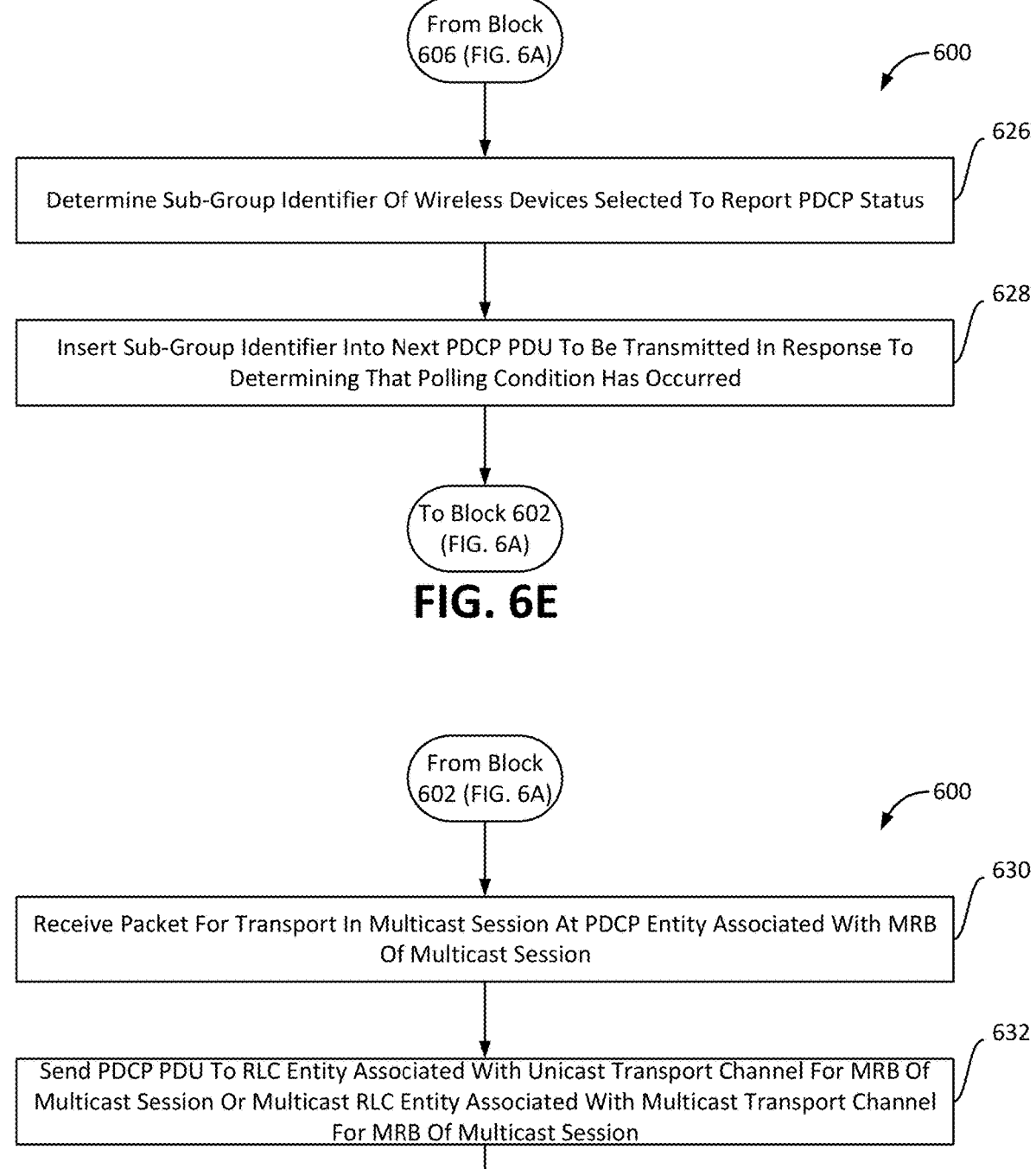

From Block
606 (FIG. 6A)

600

626

Determine Sub-Group Identifier Of Wireless Devices Selected To Report PDCP Status

628

Insert Sub-Group Identifier Into Next PDCP PDU To Be Transmitted In Response To Determining That Polling Condition Has Occurred To Block 602
(FIG. 6A)

FIG. 6E

From Block
602 (FIG. 6A)

600

630

Receive Packet For Transport In Multicast Session At PDCP Entity Associated With MRB Of Multicast Session

632

Send PDCP PDU To RLC Entity Associated With Unicast Transport Channel For MRB Of Multicast Session Or Multicast RLC Entity Associated With Multicast Transport Channel For MRB Of Multicast Session To Block 602
(FIG. 6A)

FIG. 6F

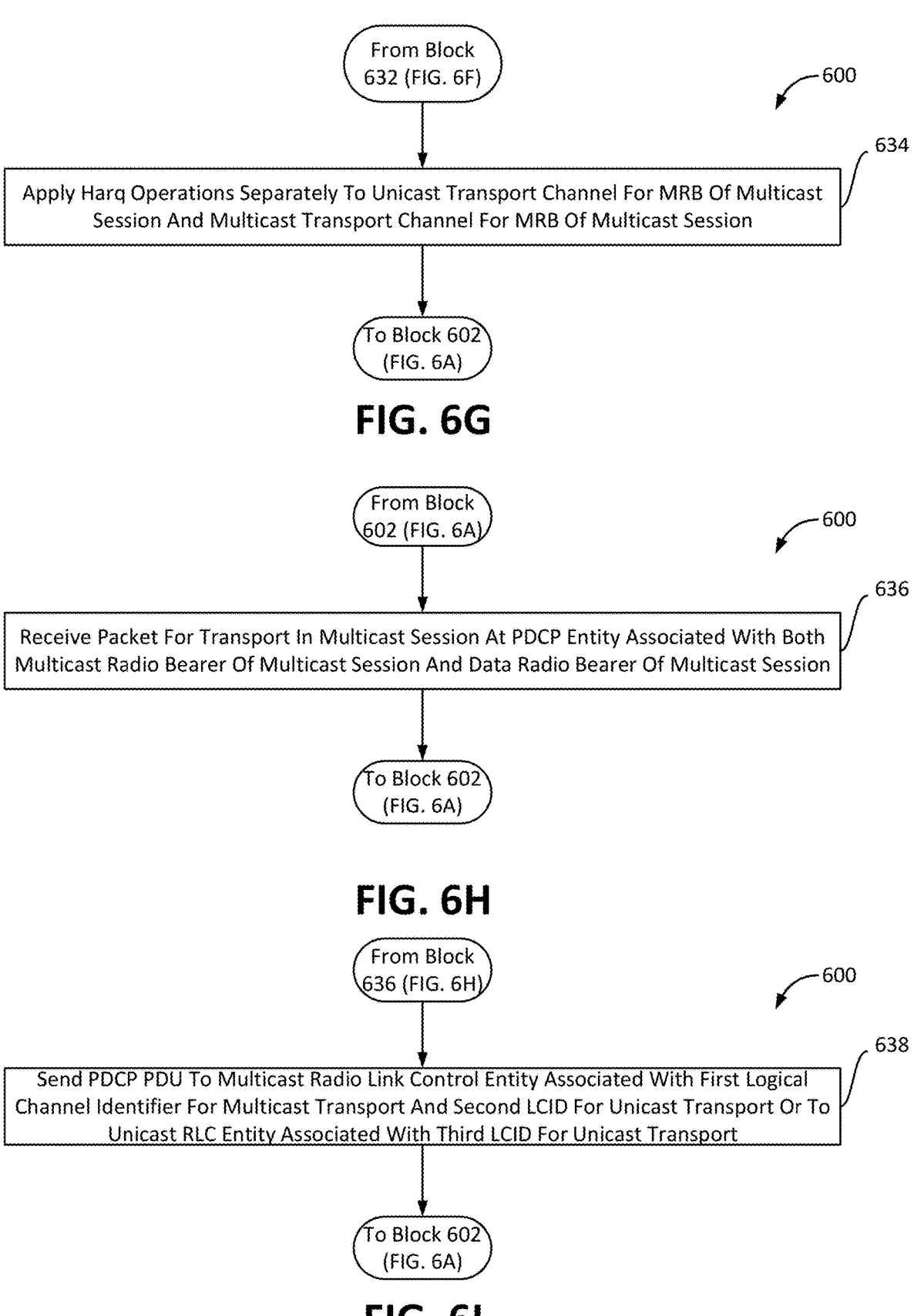

From Block
632 (FIG. 6F)

600

634

Apply Harq Operations Separately To Unicast Transport Channel For MRB Of Multicast
Session And Multicast Transport Channel For MRB Of Multicast Session To Block 602
(FIG. 6A)

FIG. 6G

From Block
602 (FIG. 6A)

600

636

Receive Packet For Transport In Multicast Session At PDCP Entity Associated With Both
Multicast Radio Bearer Of Multicast Session And Data Radio Bearer Of Multicast Session To Block 602
(FIG. 6A)

FIG. 6H

From Block
636 (FIG. 6H)

600

638

Send PDCP PDU To Multicast Radio Link Control Entity Associated With First Logical
Channel Identifier For Multicast Transport And Second LCID For Unicast Transport Or To
Unicast RLC Entity Associated With Third LCID For Unicast Transport To Block 602
(FIG. 6A)

FIG. 6I

MRB ARCHITECTURE WITH PDCP RETRANSMISSION

RELATED APPLICATIONS

This application claims the benefit of priority as a national stage application of PCT Application No. PCT/CN2020/106510 entitled "MRB Architecture with PDCP Retransmission" filed 3 Aug. 2020, which is incorporated herein by reference for all purposes.

BACKGROUND

Long Term Evolution (LTE), Fifth Generation (5G) new radio (NR)(5GNR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements have facilitated the emergence of new ways to deliver media and content to mobile wireless devices, including broadcast, multicast and unicast media delivery technologies.

SUMMARY

Various aspects include systems and methods for supporting retransmission in a multicast session in a Fifth Generation (5G) New Radio (NR) (5G NR) radio access network (RAN). Various aspects may provide an enhanced multicast radio bearer (MRB) architecture leveraging Packet Data Convergence Protocol (PDCP) status reporting by wireless devices to a base station of a 5G NR RAN. Various aspects may support multiple Radio Link Control (RLC) entities, also referred to as RLC legs, in a multicast session. One or more multicast RLC legs may be used for multicast and/or unicast transmission to wireless devices and a unicast RLC leg may be used for unicast transmission to a specific wireless device. Various aspects may enable PDCP level retransmission of PDCP protocol data units (PDUs). Various aspects may include methods performed by a processor of a wireless device and/or a processor of a base station of a 5G NR RAN.

Various aspects may include determining whether a PDCP status reporting condition for the multicast session has occurred, generating a PDCP status report indicating at least a first missing count (FMC) of a next not received PDCP protocol data unit (PDU) for the multicast session in response to determining that the PDCP status reporting condition for the multicast session has occurred, and sending the PDCP status report to a base station of the 5G NR RAN.

Some aspects may further include receiving a retransmitted PDCP PDU from the base station of the 5G NR RAN via a unicast transport channel or a multicast transport channel, wherein the retransmitted PDCP PDU corresponds to the next not received PDPC PDU. In some aspects, the next not received PDPC PDU was scheduled to be received via the multicast transport channel, and the retransmitted PDCP PDU is received via the multicast transport channel. In some aspects, the next not received PDPC PDU was scheduled to be received via the multicast transport channel, and the retransmitted PDCP PDU is received via the unicast transport channel. In some aspects, the PDCP status reporting condition for the multicast session comprises receiving a PDCP PDU including a polling bit from the base station of the 5G NR RAN. In some aspects, the PDCP PDU including the polling bit is received via the unicast transport channel. In some aspects, the PDCP PDU including the polling bit is received via the multicast transport channel.

In some aspects, a probability factor is configured as part of MRB PDCP configuration. Some aspects may further include generating a random number in response to receiving the PDCP PDU including the polling bit, and determining whether the PDCP status reporting condition for the multicast session has occurred comprises determining whether the random number corresponds to the PDCP status reporting condition based at least in part on the probability factor. In some aspects, the PDCP PDU including the polling bit includes a sub-group identifier, and determining whether the PDCP status reporting condition for the multicast session has occurred includes determining whether the sub-group identifier corresponds to a sub-group identifier configured to the wireless device. In some aspects, the PDCP status reporting condition for the multicast session comprises a countdown timer associated with PDCP status reporting expiring.

Some aspects may further include activating a unicast RLC entity associated with the unicast transport channel for an MRB of the multicast session and a multicast RLC entity associated with the multicast transport channel for the MRB of the multicast session.

Some aspects may further include receiving from the base station an indication to deactivate the unicast RLC entity or to deactivate the multicast RLC entity, and maintaining the RLC entity indicated for deactivation in a suspended state. In some aspects, the unicast RLC entity operates in an acknowledge mode (AM) or an unacknowledged mode (UM); and the multicast RLC entity operates in an UM or a transparent mode (TM).

Some aspects may further include activating a unicast Radio Link Control (RLC) entity associated with the unicast transport channel for a multicast radio bearer (MRB) of the multicast session and a multicast RLC entity associated with the multicast transport channel for the MRB of the multicast session, wherein the multicast RLC operates in an acknowledge mode (AM), configuring the multicast RLC entity with a first logical channel identifier (LCID) for multicast reception and a second LCID for unicast reception, and configuring the unicast RLC entity with a third LCID for unicast reception.

Some aspects may further include receiving packets for the multicast session from the base station of the 5G NR RAN associated with the second LCID, wherein the packets are hybrid automatic repeat request (HARD) encoded with the second LCID and a cell-radio network temporary identifier (C-RNTI), receiving packets for the multicast session from the base station of the 5G NR RAN associated with the first LCID, wherein the packets are HARQ encoded with the first LCID and a Group-radio network temporary identifier (G-RNTI), and/or receiving packets for the multicast session from the base station of the 5G NR RAN associated with the third LCID, wherein the packets are HARQ encoded with the third LCID and the C-RNTI.

Some aspects may further include activating a unicast Radio Link Control (RLC) entity associated with the unicast transport channel for a multicast radio bearer (MRB) of the multicast session and a multicast RLC entity associated with the multicast transport channel for the MRB of the multicast session, wherein the multicast RLC operates in an unacknowledged mode (UM), configuring the multicast RLC entity with a first logical channel identifier (LCID) for multicast reception, and configuring the unicast RLC entity with a second LCID for unicast reception.

Some aspects may further include receiving packets for the multicast session from the base station of the 5G NR RAN associated with the first LCID, wherein the packets are hybrid automatic repeat request (HARQ) encoded with the first LCID and a group-radio network temporary identifier (G-RNTI), and/or receiving packets for the multicast session from the base station of the 5G NR RAN associated with the second LCID, wherein the packets are HARQ encoded with the second LCID and a cell-radio network temporary identifier (C-RNTI).

Some aspects may further include activating a unicast Radio Link Control (RLC) entity associated with the unicast transport channel for a multicast radio bearer (MRB) of the multicast session and a multicast RLC entity associated with the multicast transport channel for the MRB of the multicast session, wherein the multicast RLC operates in an acknowledge mode (AM) or an unacknowledged mode (UM) and the unicast RLC operations in an AM or a UM, configuring the multicast RLC entity with a first logical channel identifier (LCID) for multicast reception, and configuring the unicast RLC entity with a second LCID for unicast reception.

Some aspects may further include receiving packets for the multicast session from the base station of the 5G NR RAN associated with the first LCID, wherein the packets are hybrid automatic repeat request (HARQ) encoded with the first LCID and a group-radio network temporary identifier (G-RNTI) or the packets are HARQ encoded with the first LCID and a cell-radio network temporary identifier (C-RNTI), and/or receiving packets for the multicast session from the base station of the 5G NR RAN associated with the second LCID, wherein the packets are HARQ encoded with the second LCID and the C-RNTI.

Various aspects may include receiving a packet for transport in the multicast session at a Packet Data Convergence Protocol (PDCP) layer, storing a copy of the packet for transport in a re-transmission buffer of the PDCP layer, and adding a PDCP header to the packet for transport to generate a PDCP protocol data unit (PDU).

Some aspects may further include receiving a PDCP status report from at least one wireless device receiving the multicast session, the PDCP status report indicating at least a first missing count (FMC) of a next not received PDCP PDU for the multicast session, determining the stored copy of the packet for transport in the re-transmission buffer of the PDCP layer associated with the FMC of the next not received PDCP PDU for the multicast session, adding a PDCP header to the determined stored copy of the packet for transport in the re-transmission buffer of the PDCP layer to generate a retransmitted PDCP protocol PDU, selecting one of a unicast Radio Link Control (RLC) entity for a multicast radio bearer (MRB) of the multicast session or a multicast RLC entity associated with a multicast transport channel for the MRB of the multicast session, and sending the retransmitted PDCP PDU to the selected RLC entity for retransmission. In some aspects, selecting one of the unicast RLC entity or the multicast RLC entity for retransmission is based at least in part on a number of wireless devices requesting retransmission.

Some aspects may further include determining whether a polling condition has occurred, and inserting a polling bit into a next PDCP PDU to be transmitted in response to determining that the polling condition has occurred. In some aspects, the polling condition is expiration of a polling time. In some aspects, the polling condition is a number of PDCP PDUs sent reaching a threshold or a number of bytes of PDCP data sent reaching a threshold.

Some aspects may further include determining a probability factor, and sending an indication of the probability factor using Radio Resource Control (RRC) signaling.

Some aspects may further include determining a sub-group identifier of wireless devices selected to report PDCP status, and inserting the sub-group identifier into the next PDCP PDU to be transmitted in response to determining that the polling condition has occurred.

In some aspects, receiving the packet for transport in the multicast session at the PDCP layer comprises receiving the packet for transport in the multicast session at a PDCP entity associated with a multicast radio bearer (MRB) of the multicast session. Some aspects may further include sending the PDCP PDU to a unicast Radio Link Control (RLC) entity associated with a unicast transport channel for the MRB of the multicast session or a multicast RLC entity associated with a multicast transport channel for the MRB of the multicast session. In some aspects, the unicast RLC entity operates in an acknowledge mode (AM) or an unacknowledged mode (UM); and the multicast RLC entity operates in an AM, an UM, or a transparent mode (TM).

Some aspects may further include applying hybrid automatic repeat request (HARD) operations separately to the unicast transport channel for the MRB of the multicast session and the multicast transport channel for the MRB of the multicast session. In some aspects, receiving the packet for transport in the multicast session at the PDCP layer comprises receiving the packet for transport in the multicast session at a PDCP entity associated with both a multicast radio bearer (MRB) of the multicast session and a data radio bearer (DRB) of the multicast session.

Some aspects may further include sending the PDCP PDU to a multicast Radio Link Control (RLC) entity associated with a first logical channel identifier (LCID) for multicast transport and a second LCID for unicast transport or to a unicast RLC entity associated with a third LCID for unicast transport, wherein the multicast RLC entity operates in an acknowledge mode (AM) and the unicast RLC entity operates in an AM or unacknowledged mode (UM).

Some aspects may further include encoding packets for the multicast session associated with the first LCID using hybrid automatic repeat request (HARQ) encoding operations based at least in part on the first LCID and a group-radio network temporary identifier (G-RNTI), encoding packets for the multicast session associated with the second LCID using HARQ encoding operations based at least in part on the second LCID and a cell-radio network temporary identifier (C-RNTI), and/or encoding packets for the multicast session associated with the third LCID using HARQ encoding operations based at least in part on the third LCID and the C-RNTI.

Some aspects may further include sending the PDCP PDU to a multicast Radio Link Control (RLC) entity associated with a first logical channel identifier (LCID) for multicast transport and a unicast RLC entity associated with a second LCID for unicast transport, wherein the multicast RLC entity operates in an unacknowledged mode (UM) and the unicast RLC entity operates in an acknowledge mode (AM) or UM.

Some aspects may further include encoding packets for the multicast session associated with the first LCID using hybrid automatic repeat request (HARQ) encoding operations based at least in part on the first LCID and a group-radio network temporary identifier (G-RNTI), and/or encoding packets for the multicast session associated with the second LCID using HARQ encoding operations based at least in part on the second LCID and a cell-radio network temporary identifier (C-RNTI).

Some aspects may further include sending the PDCP PDU to a multicast Radio Link Control (RLC) entity associated with a first logical channel identifier (LCID) for multicast transport and a unicast RLC entity associated with a second LCID for unicast transport, wherein the multicast RLC entity and the unicast RLC entity operate in an acknowledge mode (AM) or an unacknowledged mode (UM).

Some aspects may further include encoding packets for the multicast session associated with the first LCID using hybrid automatic repeat request (HARQ) encoding operations based at least in part on the first LCID and a group-radio network temporary identifier (G-RNTI) or using HARQ encoding operations based at least in part on the first LCID and a cell-radio network temporary identifier (C-RNTI), and encoding packets for the multicast session associated with the second LCID using HARQ encoding operations based at least in part on the second LCID and the C-RNTI.

In some aspects, a packet originally encoded for the multicast session associated with the first LCID using HARQ encoding operations based at least in part on the first LCID and the G-RNTI is retransmitted as a packet encoded using HARQ encoding operations based at least in part on the first LCID and the C-RNTI.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above. Further aspects may include a network computing device having a processor configured to perform one or more operations of the methods summarized above. Further aspects may include a non-transitory processor-readable storage medium having stored thereon processor-executable instructions configured to cause a processor of a network computing device to perform operations of the methods summarized above. Further aspects include a network computing device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
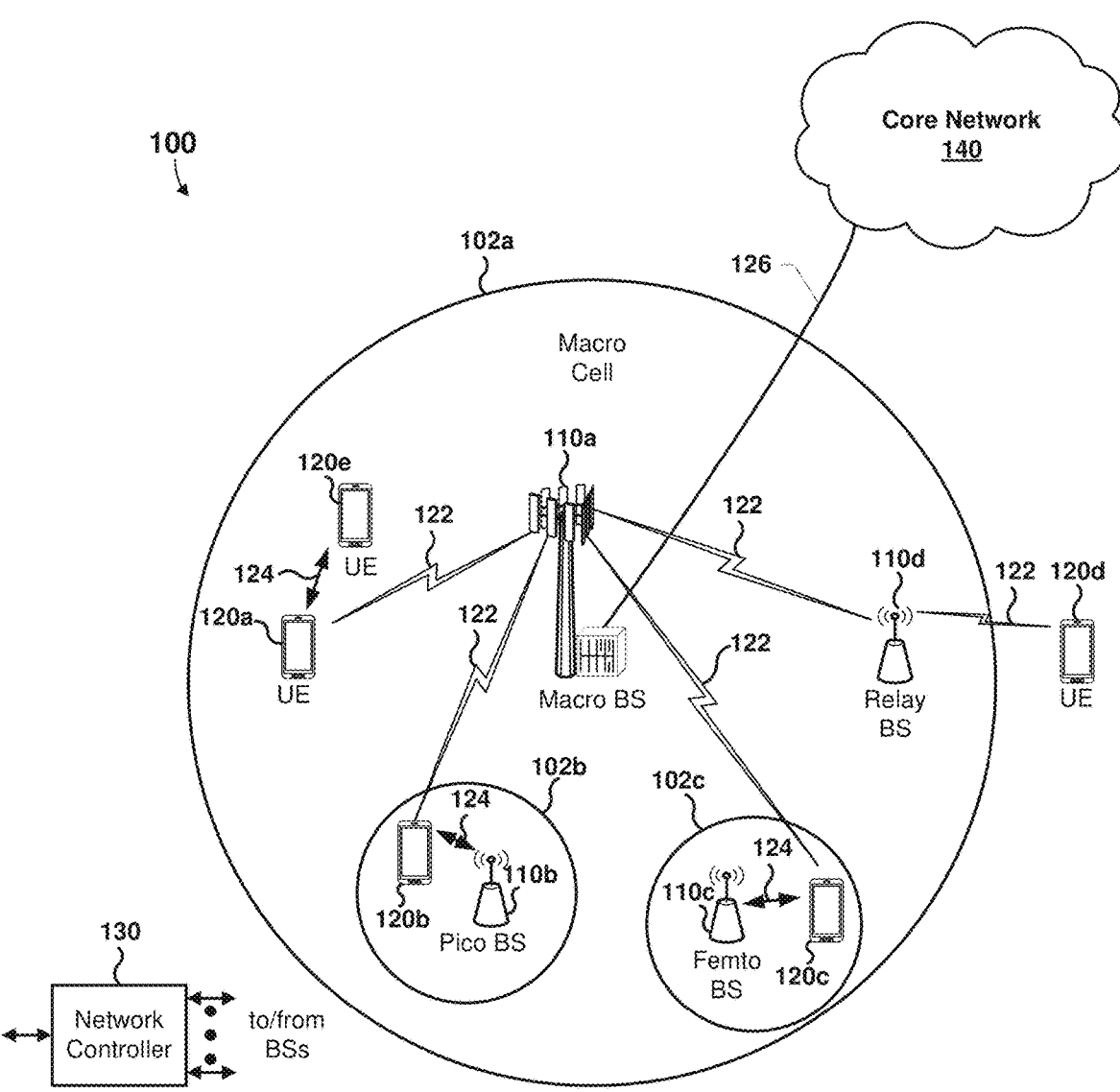
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and method for supporting retransmissions of packets in a multicast session in a Fifth Generation (5G) New Radio (NR) (5G NR) radio access network (RAN). Various embodiments include an enhanced multicast radio bearer (MRB) architecture leveraging Packet Data Convergence Protocol (PDCP) status reporting by wireless devices to a base station of a 5G NR RAN. Various embodiments may support multiple Radio Link Control (RLC) entities, also referred to as RLC legs, in a multicast session. One or more multicast RLC legs may be used for multicast and/or unicast transmission to wireless devices and a unicast RLC leg may be used for unicast transmission to a specific wireless device. Various embodiments may enable PDCP level retransmission of PDCP protocol data units (PDUs). Various embodiments may improve multicast service delivery in a 5G NR RAN by supporting handover operations between MRB and data radio bearer (DRB) operations and/or providing flexibility in retransmission in a multicast session.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements within autonomous and semiautonomous vehicles, wireless devices affixed to or incorporated into various mobile platforms, and similar electronic devices that include a memory, multiple SIMs, wireless communication components and a programmable processor.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM wireless device", "MS wireless device", "dual-SIM wireless device", and "DS wireless device" may interchangeably describe a wireless device that is configured with more than one SIM. Examples of multi-SIM wireless devices include multi-SIM multi-standby (MSMS) wireless devices, such as Dual-SIM (DS) dual-standby (DSDS) wireless devices, etc., and multi-SIM multi-active (MSMA) wireless devices, such as Dual-SIM dual-active (DSDA wireless devices, etc. An MSMS wireless device may be a wireless device that is configured with more than one SIM and allows idle-mode operations to be performed on two subscriptions simultaneously, as well as selective communication on one subscription while performing idle-mode operations on at least one other subscription. An MSMA wireless device may be a wireless device that is configured with more than one SIM and allows idle-mode and/or active mode operations to be performed on two subscriptions simultaneously using at least two different radio frequency (RF) resources (e.g., two different wireless transceivers).

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc.

Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure. Implementations for 5G systems or networks are currently being adopted that provide new radio (NR) (also referred to a 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, may broadcast packets to wireless devices in a cell. For ease of reference, the term "network device" or "network computing device" is used to refer to any of a variety of network elements that may perform operations of various embodiments, non-limiting examples of which include a base station, an eNodeB, a gNodeB, etc. A network device may provision services to wireless devices in a cell using multicast radio bearers (MRBs) and/or data radio bearers (DRBs).

FIG. 1 is a system block diagram illustrating an example communication system 100 suitable for implementing any of the various embodiments. The communications system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110*a* may communicate with the communication network 140 over a wired or wireless communication link 126. The wireless device 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120*a-e* may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some embodiments, two or more wireless devices 120a-e (for example, illustrated as the wireless device 120a and the wireless device 120e) may communicate directly using one or more sidelink channels 124 (for example, without using a base station 110a-110d as an intermediary to communicate with one another). For example, wireless device 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 2:
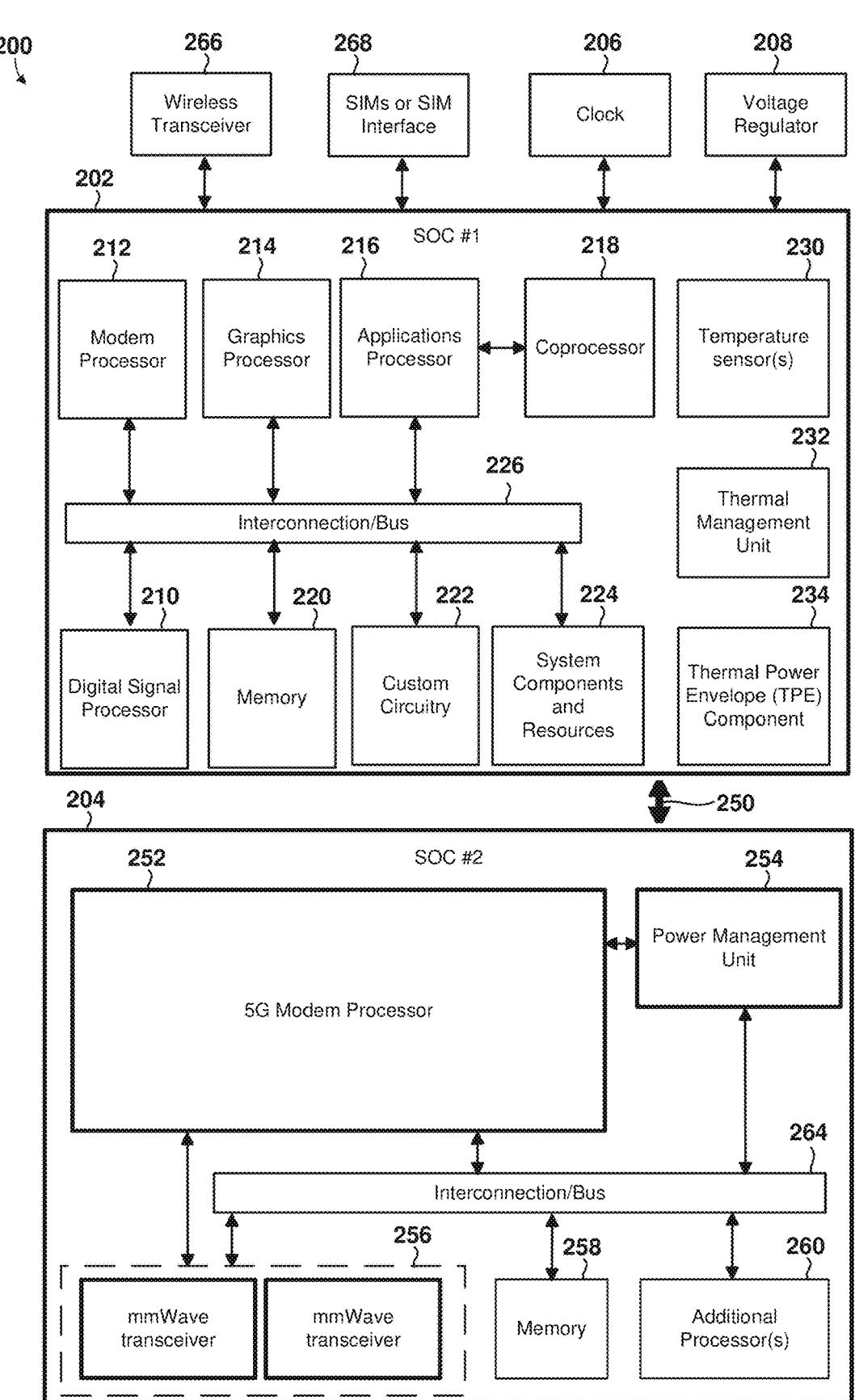
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example SIP 200 discussed above, various embodiments may be implemented in a wide variety of computing systems, which may include a single processor, multiple processors, multicore processors, or any combination thereof.

Figure 3:
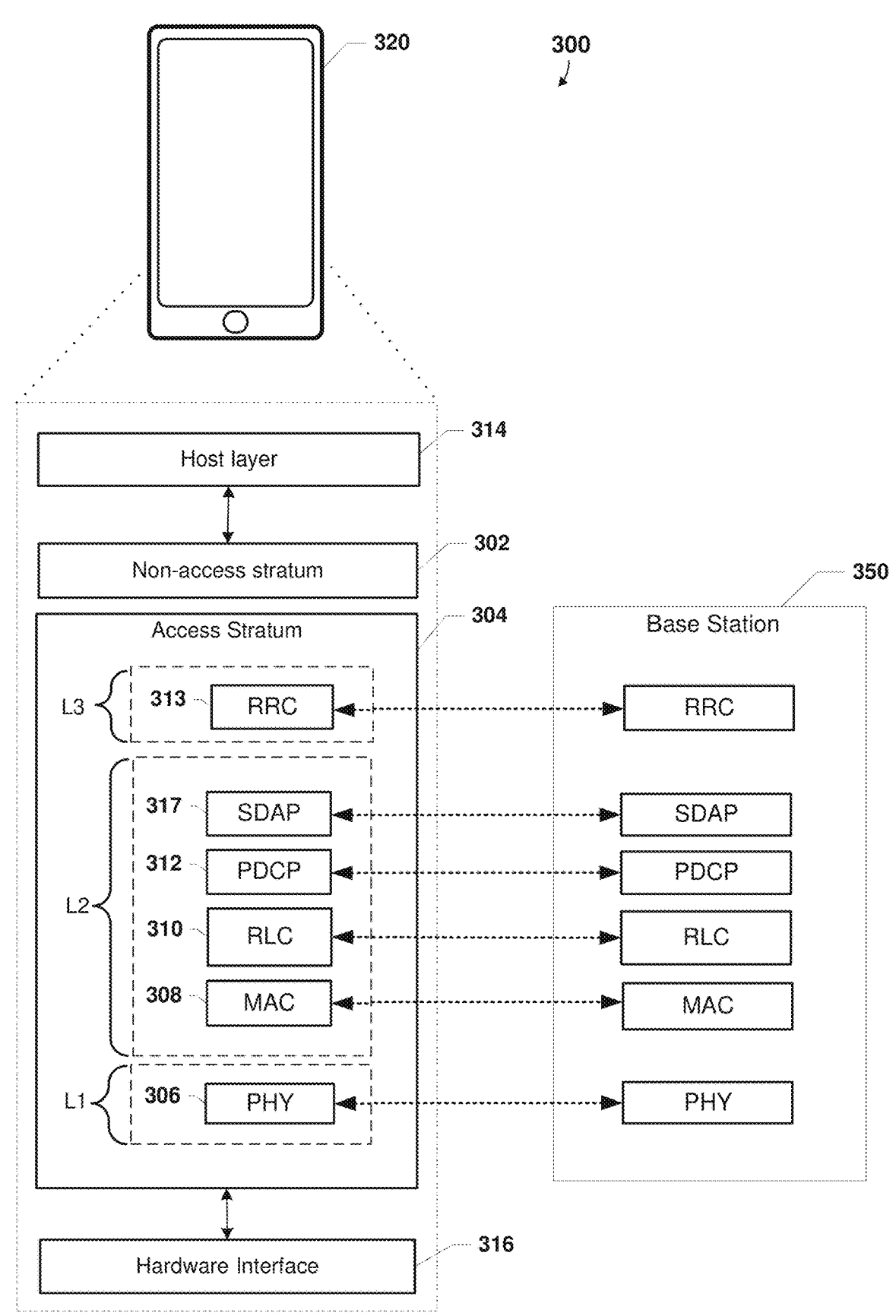
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-d) of a communication system (e.g., 100). In some embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support Channel State Information (CSI) measurements and reporting (e.g., Channel Quality Indicator (CQI) measurements and reporting).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio Link Control (RLC) sublayer 310, a Packet Data Convergence Protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In the downlink, at the base station 350, the SDAP sublayer 317 may provide mapping for DL Multicast QoS flows to one of multicast radio bearers (MRBs) or DRBs. In the uplink, at the wireless device 320, the SDAP sublayer 317 may deliver DL received Multicast QoS flows to upper layers. In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARD) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
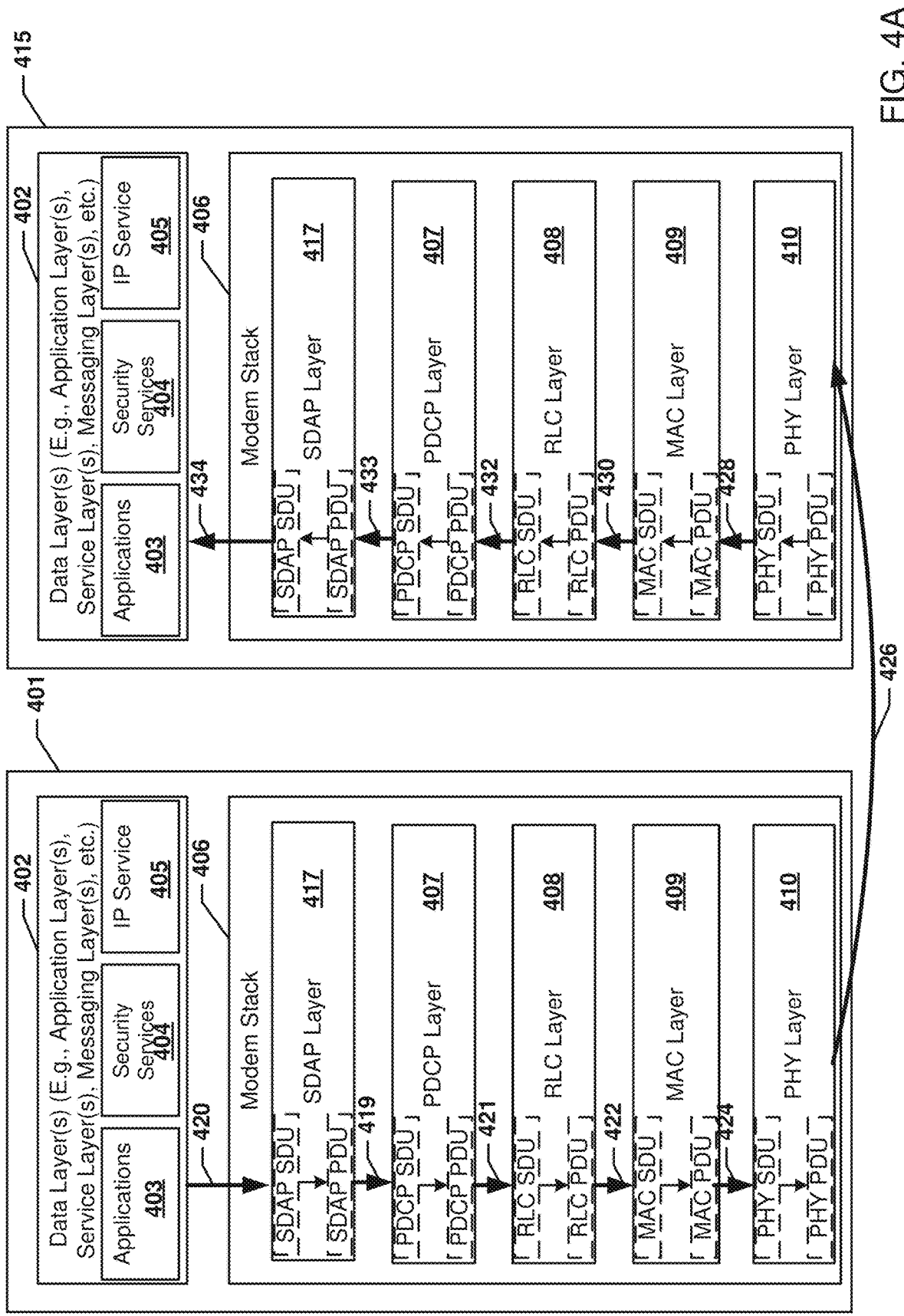
FIG. 4A is a block diagram illustrating an example of interactions between stack architecture layers in a transmitting communication device and a receiving communication device in accordance with various embodiments.

FIG. 4A illustrates interactions between stack architecture layers in a transmitting communication device 401 and a receiving communication device 415 in accordance with various embodiments. With reference to FIGS. 1-4A, the communication devices 401, 415 may each be any type of communication device (e.g., wireless device 120a-120e, 200, 320, base station 110a-d, 350) implementing various embodiments. As a specific example, the communication device 401 may be a base station of a 5G NR RAN (e.g., a gNB) and the communication device 415 may a wireless device (also referred to as a UE).

Each communication device 401, 415 may include one or more higher data layers 402 configured to exchange data with a modem stack (or radio protocol stack) 406. As examples, the higher data layers 402 may be one or more application layers, one or more service layers, one or more messaging layers, application layers, etc. As examples, the functionality performed in the higher data layers 402 may include applications 403 (e.g., multicast applications, messaging applications, etc.), security services 404, Internet Protocol (IP) services 405 (e.g., Transmission Control Protocol (TCP) services, Uniform Datagram Protocol (UDP) services, etc.), other higher data layer functionality, or any combination thereof. In some embodiments, the higher data layers 402 and the modem stack 406 on the communication device 401, 415 may be running on the same processor of the communication device 401, 415. In some embodiments, the higher data layers 402 and the modem stack 406 on the communication device 401, 415 may run on different processors of the communication device 401, 415. As an example, the higher data layers 402 may run on an application processor (e.g., application processor 216) and the modem stack 406 may run on a modem processor (e.g., modem processor 212, modem processor 252, modem processor 272). While illustrated in FIG. 4A as being on the same communication device 401, 415, in some embodiments, the higher data layers 402 may run on a processor of a separate communication device.

In some embodiments, the modem stack 406 may include a Service Data Adaptation Protocol (SDAP) layer 417, a packet data convergence protocol (PDCP) layer 407, a radio link control (RLC) layer 408, a media access control (MAC) layer 409, and a physical (PHY) layer 410. The PHY 410 may be the lowest layer of the modem stack 406 and the PDCP layer 407 may be the highest layer of the modem stack 406.

The SDAP layer 417 may handle SDAP packets and may provide mapping between Quality of Service (QoS) flows and data radio bearers (DRBs). SDAP entities of the SDAP layer 417 may receive SDAP. In a downlink (DL) direction, at the base station (e.g., gNB side), the SDAP layer 417 may provide mapping for DL Multicast QoS flows to one of multicast radio bearers (MRBs) or DRBs. In the uplink (UL) direction, at the wireless device side, the SDAP layer 417 may deliver DL received Multicast QoS flows to upper layers. The SDAP layer 417 may receive packets from the higher data layers 402 and may output packets to the PDCP layer 407. The SDAP layer 417 may receive packets from the PDCP layer 407 and may output packets to the higher layers 402.

The PDCP layer 407 may handle PDCP packets and may provide maintenance of PDCP SNs, header compression, ciphering, and/or integrity protection for the PDCP packets, duplicate detection and discarding, re-ordering, in order delivery, out of order delivery etc. The PDCP layer 407 may receive packets from the higher data layers 402 and/or SDAP layer 417, and may output packets to the RLC layer 408. The PDCP layer 407 may receive packets from the RLC layer 408 and may output packets to the higher layer 402 and/or SDAP layer 417.

The RLC layer 408 may handle RLC packets and may provide error correction, segmentation, reassembly, reordering, duplication detection, error detection, and/or error recovery for the RLC packets. Additionally, the RLC layer 408 may buffer RLC packets in a reception buffer, such as to support reordering, await missing RLC packets, etc. The RLC layer 408 may operate in different modes, such as an acknowledge mode (AM), unacknowledged mode (UM), and transparent mode (TM). The RLC layer 408 may receive packets from the PDCP layer 407 and may output packets to the PDCP layer 407. The RLC layer 408 may receive packets from the MAC layer 409 and may output packets to the MAC layer 409.

The MAC layer 409 may handle various functions including mapping between logical channels and transport channels, multiplexing and demultiplexing of MAC SDUs belonging to one or different logical channels into/from transport blocks (TB) delivered to/from the physical layer on transport channels, scheduling information reporting, error correction through HARQ, priority handling between wireless devices by use of dynamic scheduling, priority handling between logical channels of one wireless device by logical channel prioritization etc. The MAC layer 409 may receive packets from the RLC layer 408 and may output packets to the RLC layer 408. The MAC layer 409 may receive packets from the PHY layer 410 and may output packets to the PHY layer 410.

The PHY layer 410 may handle PHY packets and may provide the communication interface between the hardware supporting the physical transmission medium (e.g., transceivers, antennas, etc.) and the higher layers of the modem stack 406. The PHY layer 410 may convert PHY packets into a bitstream for transmission and/or convert a received bitstream into PHY packets. The PHY layer 410 provide encoding, transmission, reception, and/or decoding for the PHY packets. The PHY layer 410 may receive packets from the MAC layer 409 and may output packets to the MAC layer 409.

The packets transferred to/from a higher data layer of the modem stack 406 may be referred to as service data units (SDUs) in a given layer and packets transferred to/from a lower layer of the modem stack 406 may be referred to as protocol data units (PDUs). For example, the packets received into the RLC layer 408 from the PDCP layer 407, as well as the packets transferred from the RLC layer 408 to the PDCP layer 407, may be referred to as RLC SDUs. Similarly, the packets received into the RLC layer 408 from the MAC layer 409, as well as the packets transferred from the MAC layer 409 to the RLC layer 408 to the MAC layer 409, may be referred to as RLC PDUs.

A layer's SDUs may be the next higher layer's PDUs, just as the layer's PDUs may be the next lower layer's SDUs. For example, a SDAP PDU sent to the PDCP layer 407 from the SDAP layer 417 may be referred to as a PDCP SDU upon receipt by the PDCP layer 407. As another example, a PDCP PDU sent to the RLC layer 408 from the PDCP layer 407 may be referred to as an RLC SDU upon receipt by the RLC layer 408. Similarly, a MAC SDU sent from the MAC layer 409 to the RLC layer 408 may be referred to as an RLC PDU upon receipt by the RLC layer 408.

Layers within the protocol stack may convert PDUs to SDUs and SDUs to PDUs by performing on the packets various operations assigned to that layer. For example, an RLC SDU may be segmented by the RLC layer 408 to cover the RLC SDU into one or more RLC PDUs. Similarly, a plurality of received RLC PDUs may be reordered and reassembled to covert the plurality of received RLC PDUs to an RLC SDU. Additionally, a layer may add data to a packet to covert an SDU to a PDU or a layer may remove data from a packet to convert a PDU to an SDU. For example, an RLC layer 408 may add a packet header/footer to an RLC SDU to convert the RLC SDU to an RLC PDU. Similarly, an RLC layer 408 may remove a packet header/footer from an RLC PDU to covert the RLC PDU to an RLC SDU.

Referring to FIG. 4A, the following is an example of packet handling when one communication device 401 transmits a communication that is received by another communication device 415.

An application of the higher data layer 402 of the transmitting communication device 401 may generate a packet of a message 420 for transmission to an application 403 of the receiving communication device. The packet of the message 420 may be sent from the higher data later 401 to the SDAP layer 417 that may send the message as a PDCP SDU 419 to the PDCP layer 407 of the modem stack 406 on the transmitting communication device 401.

The PDCP layer 407 may receive the packet of the message as a PDCP SDU 419 and convert the PDCP SDU to a PDCP PDU 421. The PDCP layer 407 may transfer the PDCP PDU 421 to the lower RLC layer 408.

The RLC layer 408 may receive the PDCP PDU 421 as an RLC SDU, and may convert the RLC SDU (i.e., the PDCP PDU 421) to one or more RLC PDUs 422 by, for example, adding an RLC packet header/footer and/or applying segmentation. As an example, segmentation to split the RLC SDU into multiple RLC PDUs 422 may be needed when the RLC SDU (i.e., the PDCP PDU 421) is larger than a maximum RLC PDU size. When segmentation is applied to convert the RLC SDU into multiple RLC PDUs 422, each created RLC PDU 422 may be associated with a single RLC SDU (i.e., a single PDCP PDU 421). Additionally, the RLC layer 408 may add sequence numbers to the one or more RLC PDUs 422. The sequence numbers may indicate an ordering of the one or more RLC PDUs 422. The RLC layer 408 may transfer the one or more RLC PDUs 422 to the lower MAC layer 409, which may transfer one or more MAC SDUs 424 to the physical layer 410. A similar process occurs in the protocol stack 406 on the receiving UE in SDU exchanges 428-434 among the physical layer 410, MAC layer 409, RLC layer 408, PDCP layer 407 and SDAP layer 417.

Figure 4B:
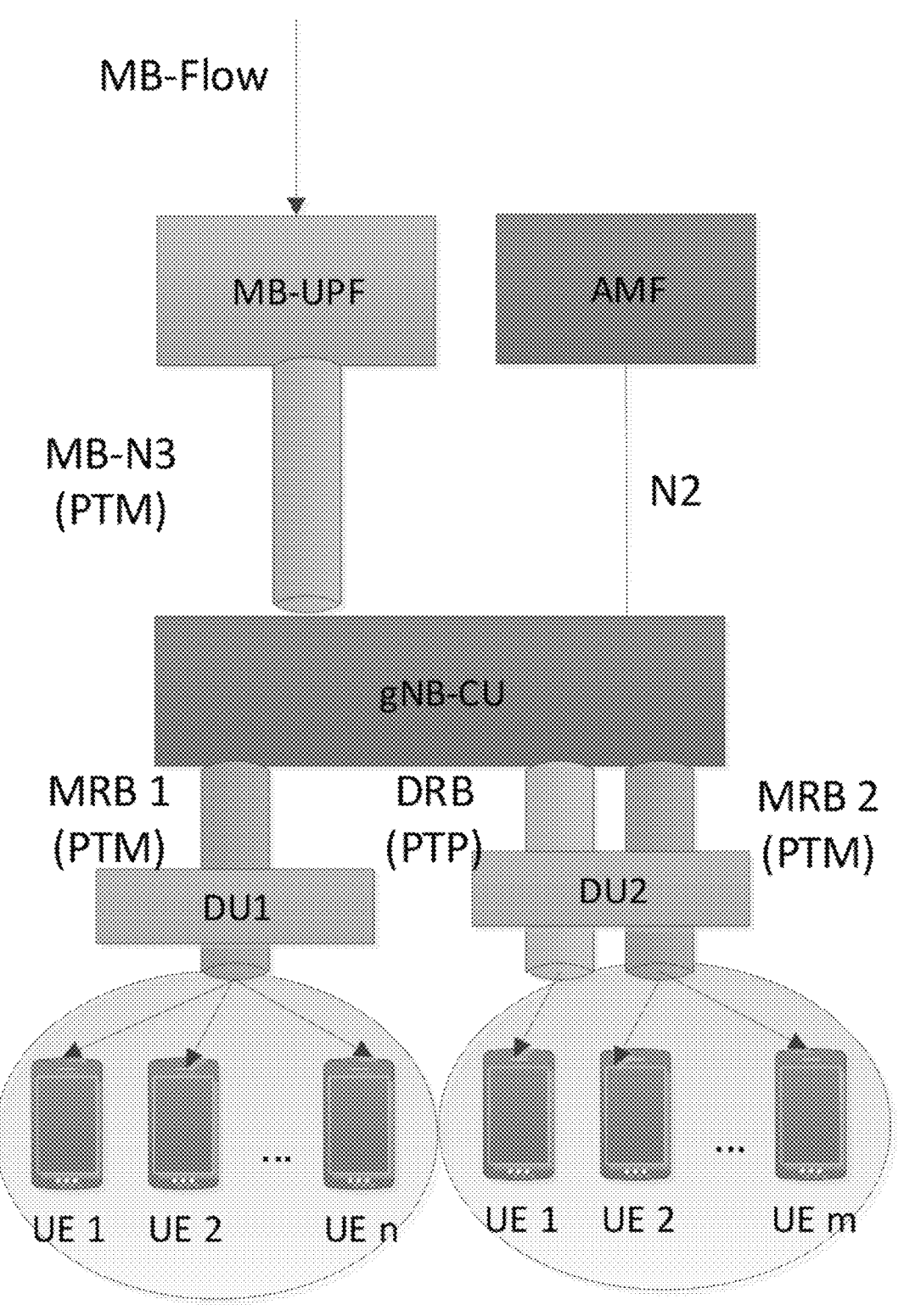
FIG. 4B is a network architecture diagram.

FIG. 4B is a network architecture diagram illustrating a 5G NR RAN architecture for delivering multicast services to wireless devices (labeled UEs in FIG. 4B). With reference to FIGS. 1-4A, the multicast services may be delivered along point-to-multipoint (PTM) paths (also referred to as multicast) and/or point-to-point (PTP) paths (also referred to as unicast). For a multicast/broadcast (MB) flow (MB-Flow), a session management function (SMF) may configure a MB Context Identifier (ID), MB Flow IDs, and associated Quality of Service (QoS) Flow IDs. For a given multicast session, a base station in the 5G NR RAN (labeled a gNB-CU in FIG. 4B) may transmit packets to a group of many different wireless devices via a multicast radio bearer (MRB). Similarly, the base station in the 5G NR RAN (labeled a gNB-CU in FIG. 4B) may transmit packets to a specific wireless device via a data radio bearer (DRB) and transmit packets to a group of different wireless devices via an MRB. The architecture may support integrated multicast/unicast transmissions or standalone multicast transmissions. In some implementations, the SMF and user plane function (UPF) may be shared or standalone. In some implementations, a MB PDU session may be associated with a unicast PDU session. In some implementations, a MB PDU session may not be associated with a unicast PDU session. In some implementations, a unicast PDU session may be associated with a MB PDU session to support mobility of wireless devices from MRBs to DRBs. In some implementations, the UPF delivers MB data to gNBs either via the MB-N3 interface (PTM) or the N3 interface (PTP). In some implementations, a gNB may be configured to select whether to serve multicast data via an MRB or a DRB. Selection between an MRB and a DRB may support multicast session service continuity.

Figure 4C:
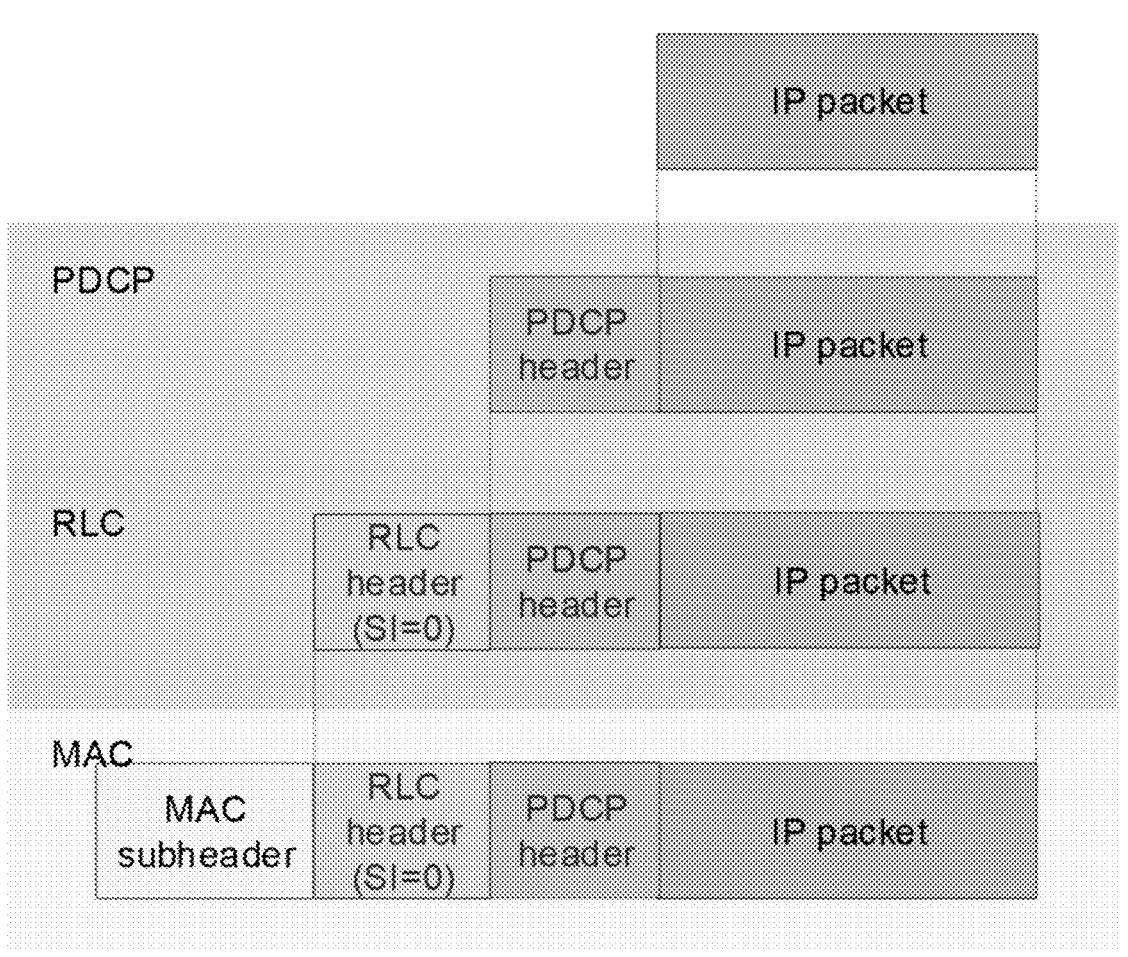
FIG. 4C is a block diagram illustrating various packet type attributes.

FIG. 4C illustrates packet transformations through the L2 layers, PDCP, RLC, and MAC. With reference to FIGS. 1-4C, the various headers added in the transmit (Tx) direction and removed in the receive (Rx) direction are illustrated. A packet for transmission in a multicast session may have a PDCP header added to it at the PDCP layer by a PDCP entity thereby generating a PDCP PDU. The PDCP PDU may have an RLC header added at the RLC layer by an RLC entity thereby generating an RLC PDU. The RLC PDU may have a MAC subheader added at the MAC layer by a MAC entity thereby generating a MAC PDU. Fast packet processing may be supported in 5G NR RANs in the L2 user-plane (U-plane). L2 packets may proceed with fast processing to a MAC layer once entering into PDCP layer. RLC "real-time" segmentation may be decoupled from automatic repeat request (ARQ) operations. Segmented and/or re-segmented RLC SDUs may be stored in a L2 buffer. The RLC header may be processed "offline" to tag the segment and/or re-segment flag. When RLC-acknowledge mode (AM) is configured, ARQ may be logically handled by Tx/Rx windowing and reassembly timer and/or a status-prohibit timer.

Various embodiments may provide an enhanced MRB architecture leveraging PDCP status reporting by wireless devices to a base station of a 5G NR RAN. Various embodiments may support multiple RLC entities, also referred to as RLC legs, in a multicast session. One or more multicast RLC legs may be used for multicast and/or unicast transmission to wireless devices and a unicast RLC leg may be used for unicast transmission to a specific wireless device. Various embodiments may enable PDCP level retransmission of PDCP protocol data units (PDUs).

Figure 4D:
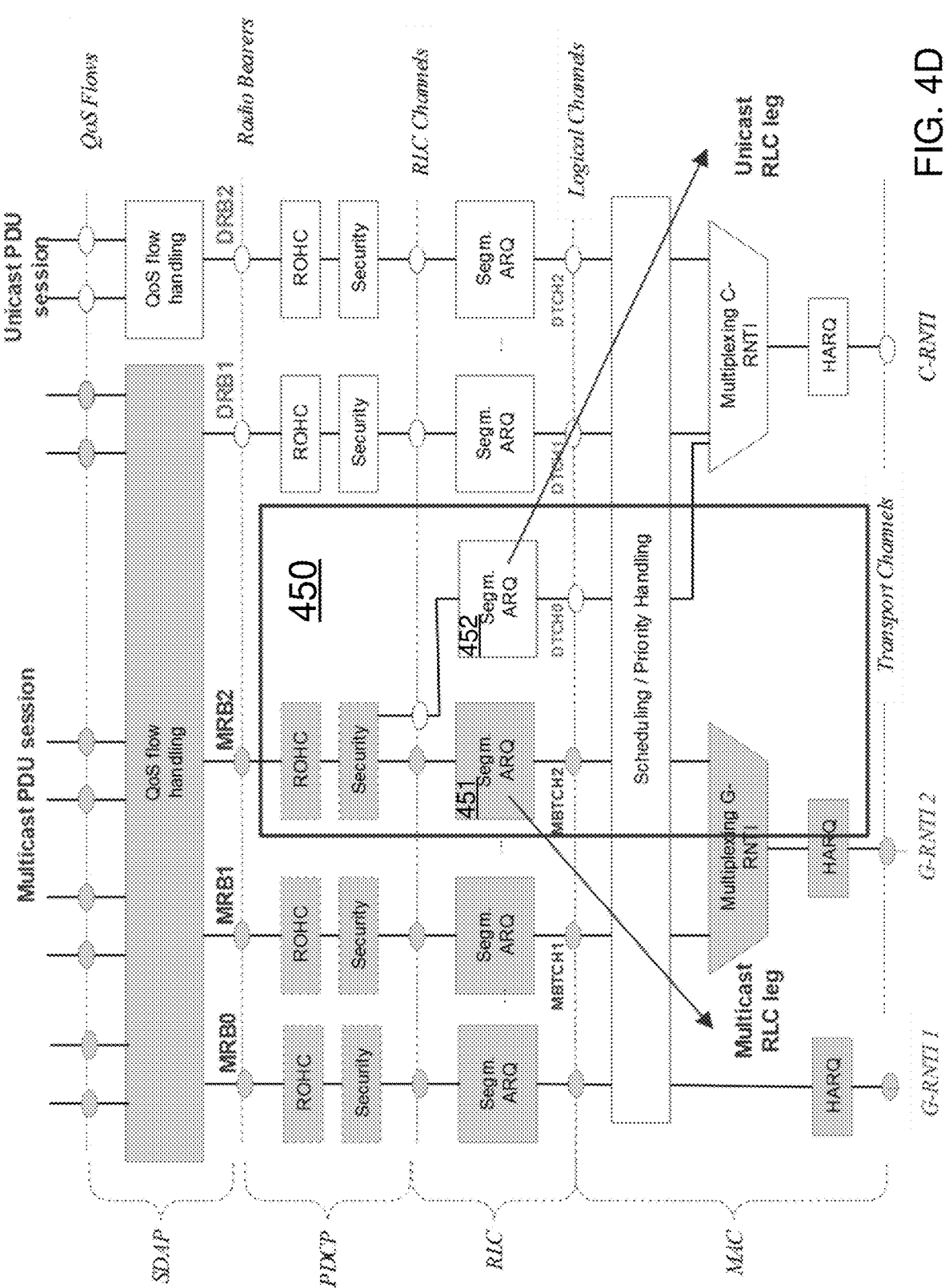
FIG. 4D is a base station architecture diagram for providing multicast sessions in accordance with various embodiments.

FIG. 4D illustrates a PDCP Re-Transmission based MRB architecture from a gNB perspective in accordance with various embodiments. With reference to FIGS. 1-4D, in various embodiments, a PDCP entity 450 of the PDCP layer may be configured to select to send packets to a multicast RLC entity (e.g., a multicast RLC leg) or a unicast RLC entity (e.g., a unicast RLC leg). For example, the PDCP entity 450 may send a PDCP PDU to the multicast RLC entity 451 and the PDCP entity 450 may send a PDCP PDU to the unicast RLC entity 452. In various embodiments, such as switchable PDCP entity 450 may be associated with an MRB for the multicast session. For example, FIG. 4D illustrates the MRB2 associated with the PDCP entity 450 providing Robust Header Compression (ROHC) and Access Stratum (AS) security, such as ciphering. ROHC and/or AS security may be optional. The multicast RLC entity 451 may be configured with a single logical channel identifier (LCID) and provide packets to the MAC layer for encoding and transmission on a multicast transport channel using that LCID (e.g., MBTCH2 illustrated in FIG. 4D). The MAC layer may perform HARQ operations to encode the packet from the multicast RLC entity 451 using a group-radio network temporary identifier (G-RNTI) and send the packet via the multicast transport channel. The unicast RLC entity 452 may be configured with a single logical channel identifier (LCID) and provide packets to the MAC layer for encoding and transmission on a unicast transport channel using that LCID (e.g., DTCH0 illustrated in FIG. 4D). The MAC and PHY layer may perform HARQ operations to encode the packet from the unicast RLC entity 452 using a cell-radio network temporary identifier (C-RNTI) and send the packet via the unicast transport channel.

In various embodiments, the PDCP entity 450 may be configured to support PDCP retransmission, such as PDCP ARQ retransmission. In various embodiments, PDCP retransmission may increase L1 layer and L2 layer reliability in multicast sessions as the PDCP entity 450 may retransmit PDCP PDUs via multicast/broadcast transmission via the multicast RLC entity 451 or via unicast transmission via the unicast RLC entity 452. Various embodiments exploiting the PDCP entity 450 with a duplicate RLC entity structure, such as multicast RLC entity 451 and unicast RLC entity 452, may enable the base station to switch to unicast transmission and/or the wireless device to transition to a base station not supporting multicast, without reconfiguring a MRB to a DRB for a multicast PDU session. In various embodiments, the 5G NR RAN may maintain a mapping between a given MRB and its logic channel used for unicast delivery (e.g., DTCH0 for MRB2 in FIG. 4D).

In various embodiments, a wireless device may similarly maintain two RLC entities, a multicast RLC entity and a unicast RLC entity, for each PDCP entity the wireless device maintains for the multicast session when the base station activates switchable PDCP entity 450 having two RLC entities 451, 452. In various embodiments, the multicast RLC entities at the base station (e.g., multicast RLC entity 451) and the multicast RLC entities at the wireless device may operate in an UM or a TM mode. In various, the unicast RLC entities at the base station (e.g., unicast RLC entity 452) and the unicast RLC entities at the wireless device may operate in an AM or an UM mode.

In various embodiments, wireless devices may be configured to provide PDCP status reports to the base station of the 5G NR RAN. The PDCP status reports may indicate at least a first missing count (FMC) of a next not received PDCP PDU for the multicast session. In various embodiments, the PDCP entity 450 may receive the PDCP status reports and use the PDCP status reports to enable PDCP retransmission. In various embodiments, the base station of the 5G NR RAN may maintain a re-transmission buffer for the PDCP layer. The base station of the 5G NR RAN may store a copy of a packet for transport in a multicast session in the re-transmission buffer. For example, the PDCP entity 450 may store a copy of a packet for transport in the re-transmission buffer. The base station of the 5G NR RAN may add a PDCP header to a packet for transport to generate a PDCP PDU and provide the PDCP PDU to a multicast RLC entity 451 and/or unicast RLC entity 452 for transmission on the multicast RLC leg or unicast RLC leg.

The architecture illustrated in FIG. 4D illustrates a common PDCP 450 entity with a multicast RLC leg operating in an UM or TM mode and a unicast RLC leg operating in an UM or AM mode. PDCP level re-transmissions may be used as the multicast RLC leg may not be configured to support ARQ. PDCP re-transmissions may be sent by the base station (e.g., the gNB) either by the unicast or multicast RLC legs.

Figure 4E:
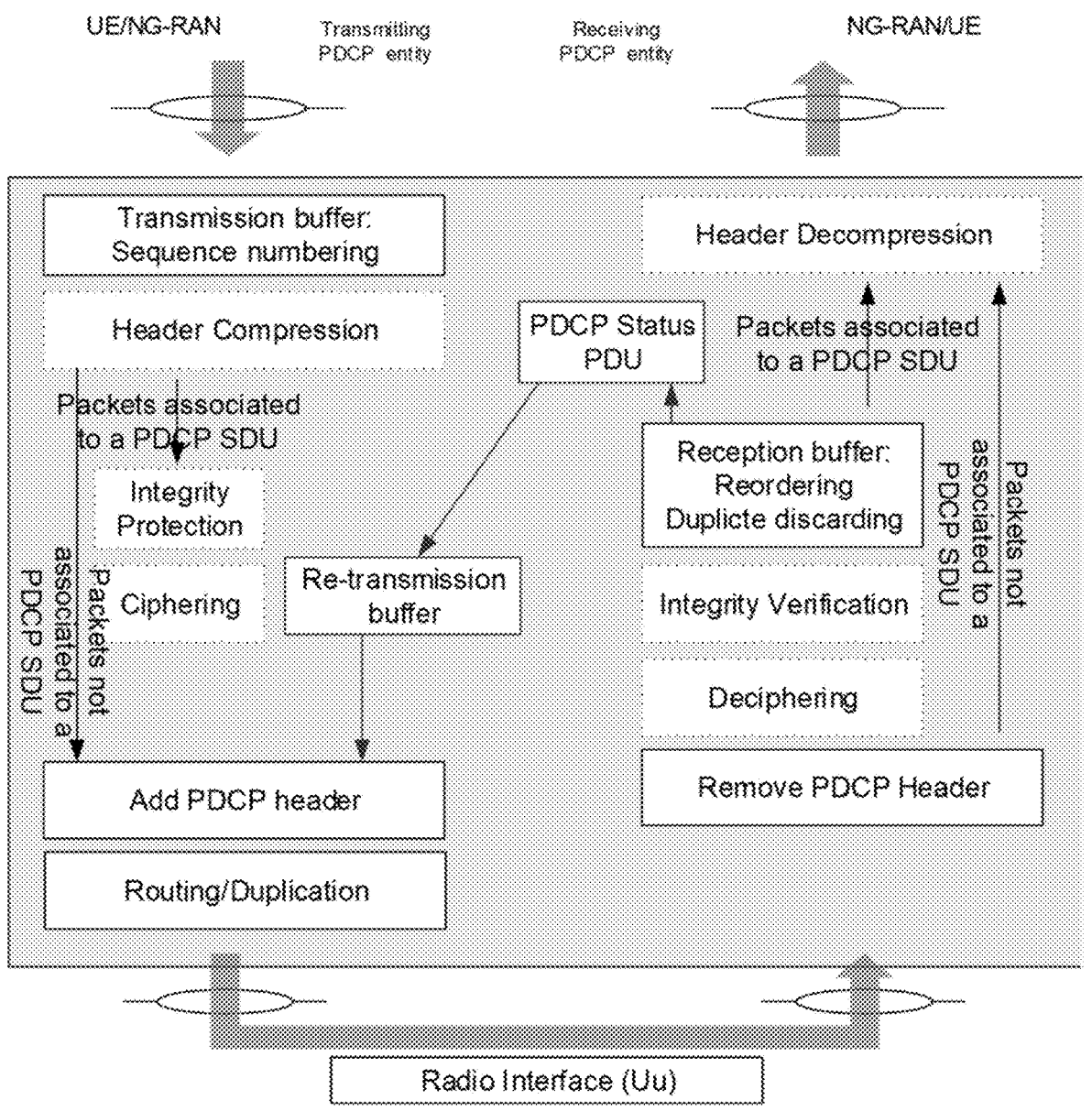
FIG. 4E is a block diagram illustrating an example base station and wireless device configuration to support multicast sessions in accordance with various embodiments.

FIG. 4E illustrates an enhanced PDCP functionality for MRB that supports PDCP retransmission according to various embodiments. With reference to FIGS. 1-4E, FIG. 4E illustrates the re-transmission buffer in the Tx path and a PDCP status report, such as a PDCP status PDU, being generated in the Rx path. For example, a PDCP status PDU module on a wireless device may track PDCP PDU reception and generate PDCP status reports. The PDCP status PDU module may monitor a reception buffer reordering and discarding duplicates of packets received at the PDCP layer of the wireless device. The PDCP status PDU module may send the PDCP status reports to the base station of the 5G NR RAN. The PDCP layer of the base station of the 5G NR RAN may use the PDCP status reports to determine whether or not re-transmission of a PDCP PDU may be necessary.

As an example, a basic procedure in the PDCP Tx path may include associating the COUNT value corresponding to TX_NEXT to the PDCP SDU, perform header compression of the PDCP SDU when ROHC is configured for the MRB, perform IP and ciphering using the TX_NETX when AS security is configured for the MRB, retransmitting the PDCP SDU for recovery from the retransmission buffer based on one or more received PDCP status reports, setting the PDCP serial number (SN) of the PDCP data PDU to TX_NEXT, incrementing TX_Next by one, and submit the resulting PDCP data PDU to a lower layer (e.g., to the multicast RLC entity 451 and/or unicast RLC entity 452.

As an example, a basic procedure in PDCP Rx path may include performing a window based PDCP Rx procedure (e.g., for PDCP in-order delivery, and PDU duplication detection), and generating a PDCP status report (e.g., a PDCP status PDU) to feed back the PDCP Rx status. The wireless device may send the PDCP status report via the unicast RLC leg.

Various embodiments support polling in the PDCP Tx path. In various embodiments, a polling mechanism may be provided in the PDCP Tx path to support PDCP status PDU feedback from the PDCP Rx path. In various embodiments, PDCP polling may operate in conjunction with, or in place of, RLC AM polling.

In some embodiments, a PDCP entity in the PDCP Tx path, such as PDCP entity 450, may configure periodic polling. In various embodiments, a PDCP entity, such as PDCP entity 450, may determine whether a polling condition has occurred, and in response to a polling condition occurring may trigger polling to receive PDU status reports from one or more wireless devices. In some embodiments, a periodic polling timer may be configured by RRC signaling. In some embodiments, a polling bit may be inserted in a PDCP data PDU when the polling timer is expired. As a specific example, a first RRC parameter may enable or disable a polling timer and a second RRC parameter may be a timer with a configured value in PDCP-Config. Alternatively, an infinite value may represent as disabled timer.

In various embodiments, a base station of a 5G NR RAN may determine whether a polling condition has occurred and insert a polling bit into a next PDCP PDU to be transmitted in response to determining that the polling condition has occurred. The polling condition may be an expiration of a polling time. The polling condition may be a number of PDCP PDUs sent reaching a threshold. The polling condition may be a number of bytes of PDCP data sent reaching a threshold.

In some embodiments, a polling bit (e.g., P field) may be inserted in the PDCP data PDU, such as in the PDCP header to trigger PDCP status reporting by wireless devices. The polling bit may be inserted in response to a number of PDCP data PDUs sent without polling reaching a configured threshold, such as a threshold configured by RRC signaling. The polling bit may be inserted in response to a number of bytes of PDCP data PDUs sent without polling reaching a configured threshold, such as a threshold configured by RRC signaling.

In some embodiments, in the PDCP Rx path a prohibit timer may be configured by RRC signaling. A PDCP Rx entity may be configured with one prohibit timer. In some embodiments, a wireless device may generate and report PDCP status PDUs once the prohibit timer is expired. RRC configuration messages may enable or disable the polling timer. The timer may be a configured value in PDCP-Config and an infinite value may represent as disable timer. In some embodiments, the prohibit timer starts or restarts when one PDCP data PDU arrives at an empty PDCP Rx buffer or a PDCP status PDU is sent. The PDCP status PDU may be sent only when the prohibit timer is expired.

In various embodiments, in the downlink (DL) direction, a base station (e.g., a gNB) may send polling bits either via a multicast RLC leg or a unicast RLC leg. In some embodiments using the multicast RLC leg, all wireless devices may receive the PDCP polling request. In the uplink (UL) direction, a wireless device may send a PDCP status PDU via a unicast RLC leg. In some embodiments, a feedback probability may be configured per MRB to reduce the UL load. For example, when a polling request is received, the wireless device may generate a random number and compare that random number with the probability factor to determine whether or not to send feedback. In various embodiments, the probability factor may be configured to wireless devices as part of MRB PDCP configuration.

Alternatively, a base station (e.g., a gNB) may set polling bits for different groups of wireless devices, such as sub-groups, such that only a sub-group of wireless devices may trigger RLC Status reporting. For example, different wireless device sub-groups may be mapped to different bits 11,10,01,00. Grouping can be based on last digit of Subscription Permanent Identifier (SUPI), International Mobile Subscriber Identity (IMSI), C-RNTI, G-RNTI, etc. In some embodiments, using the unicast RLC leg, the base station (e.g., the gNB) may send the polling bit PDCP PDU to selected wireless devices, for example wireless devices having a certain RF channel condition. In the UL direction, the wireless device may send PDCP status report, such as a PDCP status PDU, via the unicast RLC leg.

Figure 4F:
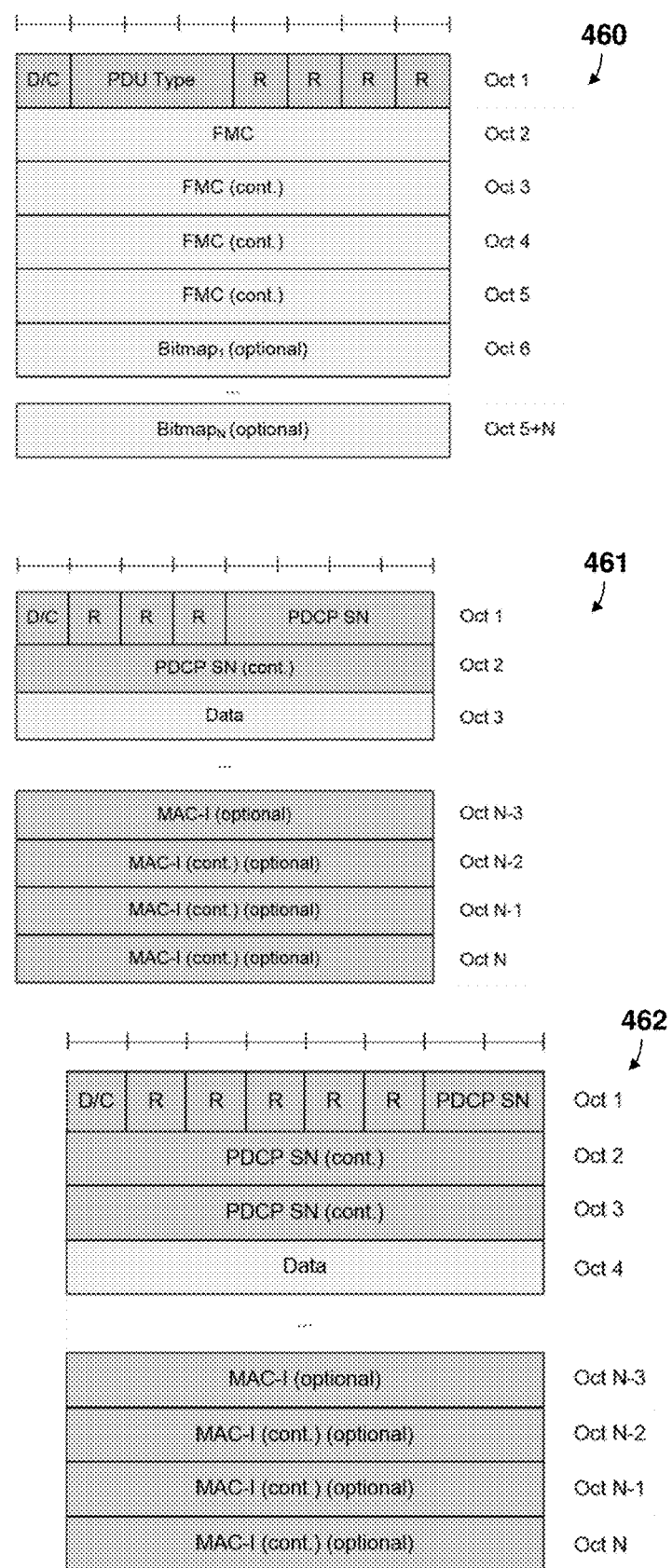
FIG. 4F is a block diagram of example PDCP packet attributes in accordance with various embodiments.

FIG. 4F illustrates aspects of a PDCP status report, such as a PDCP status PDU. With reference to FIGS. 1-4F, three example PDCP status PDU formats 460, 461, and 462 that may support PDCP status reporting are illustrated. In various embodiments, in the PDCP Rx path, the PDCP Rx entity generates the PDCP status PDU 460 to indicate the status of received PDCP data PDU. PDCP status PDU 460 may be transmitted by unicast on a per wireless device basis. The PDCP status PDU 460 may include the following fields: FMC (First Missing Count), indicating the COUNT of the next not received PDCP SDU; Bitmap, indicating the PDCP SDUs which are missing or correctly received in the PDCP Rx path starting from FMC where the value "1" indicates received and value "0" indicates missing. The PDCP status PDU 460 format includes FMC which may be 32 bits. This field indicates the COUNT value of the first missing PDCP SDU within the reordering window, e.g., RX_DELIV. The PDCP status PDU 460 format may optionally include bitmap. This field indicates which SDUs are missing and which SDUs are correctly received in the receiving PDCP entity. The bit position of Nth bit in the Bitmap is N, i.e., the bit position of the first bit in the Bitmap is 1.

Additionally, PDCP PDU formats 461 and 462 may support ARQ retransmission procedures in PDCP. In various embodiments, when the PDCP Tx entity receives PDCP status PDUs from PDCP Rx entities of multiple wireless devices, the PDCP Tx entity may decide to retransmit a PDCP SN based on feedback from multiple the PDCP status reports from those multiple wireless devices. The PDCP Tx entity may determine whether to re-transmit the PDCP PDU through the multicast RLC leg or the unicast RLC leg based on a number of wireless devices requesting re-transmission. The PDCP PDU formats 461 and 462 may be a 12- and 18-bit PDCP SN. If there is no PDCP based AS security, the PDCP data PDU may not include MAC-integrity (MAC-I) fields.

In various embodiments, a PDCP entity may be associated with both an MRB of the multicast session and a DRB of the multicast session. In this manner, a PDCP entity of a PDCP layer may be a common PDCP entity for multicast RLC legs and unicast RLC legs for a multicast session.

Figure 4G:
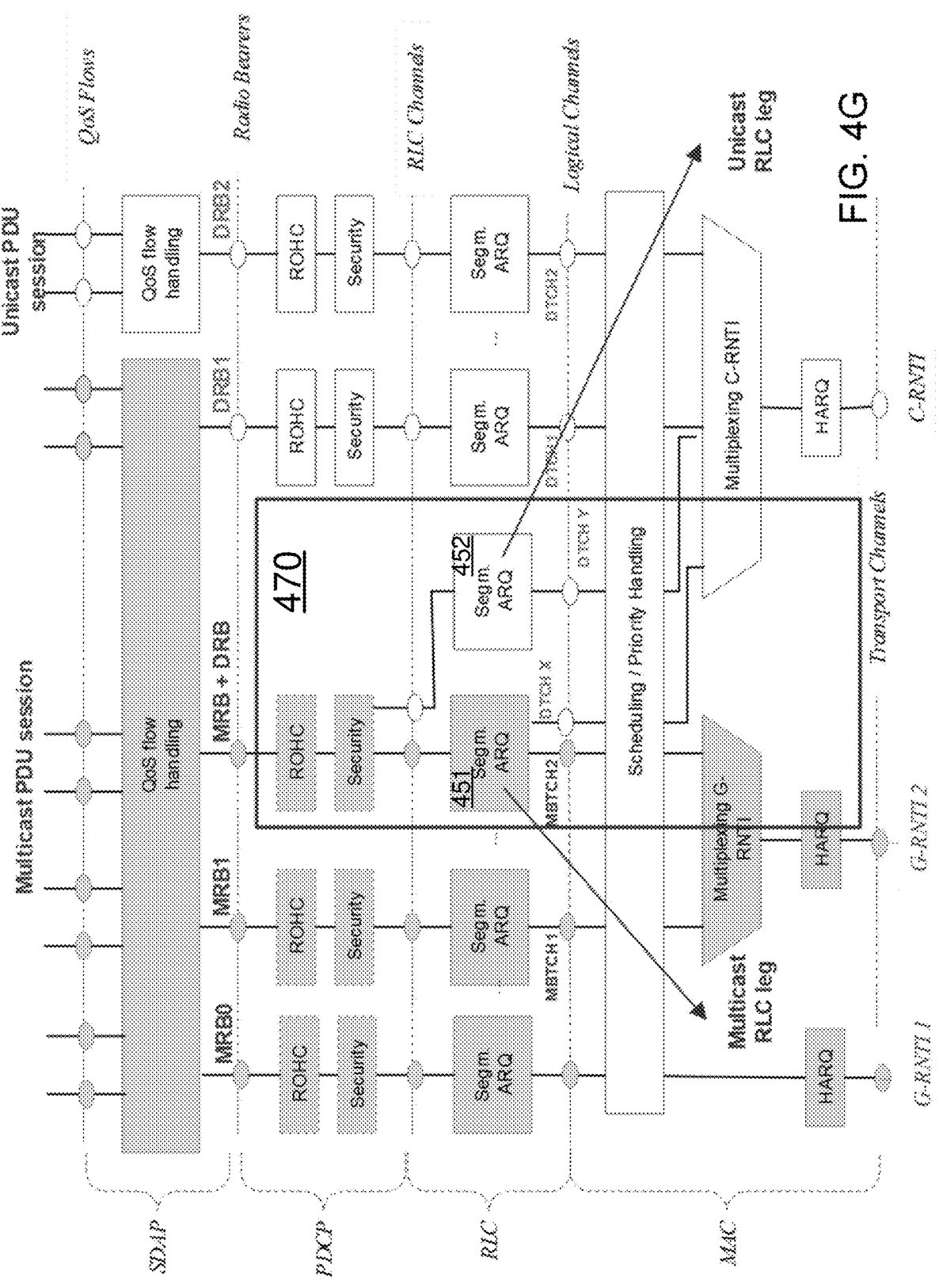
FIG. 4G is a base station architecture diagram for providing multicast sessions in accordance with various embodiments.

FIG. 4G illustrates an example architecture of a common PDCP entity 470 for MRB and DRB RLC legs according to various embodiments. With reference to FIGS. 1-4G, the common PDCP entity 470 is similar to PDCP entity 450, except that both an MRB and a DRB are associated the PDCP entity 470. The PDCP duplication structure of PDCP entity 470 may allow for switching between unicast and multicast without reconfiguring an MRB and/or a DRB. The common PDCP entity 470 may enable loss-less switching between MRB and DRB through the various PDCP recovery and retransmission embodiments discussed herein. The common PDCP entity 470 may enable loss-less handover between MRB to MRB, MRB to DRB, and DRB to MRB during handover. In various embodiments, the common PDCP entity 470 may support an MRB RLC leg and a DRB RLC leg. In various embodiments, PDCP level re-transmission may be supported by the common PDCP entity 470. The common PDCP entity 470 may select the multicast RLC leg for retransmission or the unicast RLC leg for retransmission.

In various embodiments, the logical channel configuration for the RLC entities 451, 452 associated with the common PDCP entity 470 may be different depending on the mode in which the multicast RLC entity 451 may be operating. In various embodiments, the multicast RLC entity 451 may be configured to operate in AM or UM mode.

In various embodiments, when the multicast RLC entity 451 may be operating in AM mode, the multicast RLC entity 451 may be associated with two different logical channels, such as two different LCIDs. The first LCID may be used for multicast and may be associated with the G-RNTI for HARQ operations. The second LCID may be used for unicast (or wireless device specific transmissions) and may be associated with the C-RNTI for HARQ operations. For example, FIG. 4G illustrates the multicast RLC entity 451 having a first LCID of MBTCH2 and a second LCID of a data traffic channel X (DTCHX). The unicast RLC entity 452 may have its own respective LCID (e.g., a third LCID DTCHY). The LCID of the unicast RLC entity 452 may be associated with the C-RNTI for HARQ operations. The configuration of the unicast RLC entity 452 in AM or UM may be a configuration selection.

In various embodiments, when the multicast RLC entity 451 may be operating in UM mode, the multicast RLC entity 451 may be have a single LCID. RLC re-transmission may not be supported in the UM mode as there may only be a single LCID associated with the multicast RLC entity 451. That single LCID (e.g., LCID MBTCH 2) of the multicast RLC entity 451 may be used for multicast and may be associated with the G-RNTI for HARQ operations. As such, no separate data channel may be associated with multicast RLC entity 451 in the UM mode. The unicast RLC entity 452 may have its own respective LCID (e.g., a second LCID DTCHY). The LCID of the unicast RLC entity 452 may be associated with the C-RNTI for HARQ operations. The configuration of the unicast RLC entity 452 in AM or UM may be a configuration selection.

In various embodiments, the 5G NR RAN network may activate and/or deactivate either multicast RLC legs (e.g., multicast RLC entity 451) or unicast RLC legs (e.g., unicast RLC entity 452). RLC legs may be deactivate by MAC Control Element (CE) signaling, RRC signaling, PDCCH signaling, etc. In various embodiments, when an RLC leg is deactivate by the 5G NR RAN, the wireless device may maintain the deactivated RLC leg configuration in a suspended state. In this manner, should the RLC leg be reactivated by the 5G NR RAN, time may be saved by avoiding reconfiguration of the reactivated RLC leg.

In various embodiments, at the time of switching between MRB and DRB RLC legs, data recover may be supported by PDCP level re-transmission. For example, PDCP status report triggering may be activated in response to a switch between MRB and DRB.

The architecture of FIG. 4G illustrates that one MRB and one DRB may be integrated with the common PDCP entity 470. The MRB leg uses a multicast RLC entity 451, which can operate in AM or UM mode thereby supporting multicast RLC leg ARQ based re-transmissions. The unicast DRB RLC leg may also operate in AM or UM mode, the selection of AM or UM mode may be specific to one wireless device. In the architecture of FIG. 4G, PDCP level ARQ may not be needed as the multicast RLC entity may be capable of supporting ARQ functionality. In various embodiments, PDCP re-transmissions may be used for MRB to DRB (or DRB to MRB) switching to avoid any loss of data due to activating and deactivating one of the RLC legs. The multicast RLC leg may be associated with two LCIDs, one LCID for multicast and another one for unicast RLC re-transmission purposes.

For FIG. 4G's architecture, the multicast RLC leg may be configured in AM mode and associated with 2 LCIDs, such as one multicast LCID and one unicast LCID. The multicast RLC leg re-transmission may be either via multicast LCID for all wireless devices or via unicast LCID meant for a specific wireless device. The multicast LCID data may be transmitted using HARQ process which may be scrambled with G-RNTI and multicast LCID. Similarly, the unicast LCID data may be transmitted to a wireless device by using HARQ operations and may be scrambled with C-RNTI at the physical layer. In various embodiments, the multicast RLC entity 451 may be identified by the multicast LCID and G-RNTI for a group of wireless devices or unicast LCID and C-RNTI for a specific wireless device.

Figure 4H:
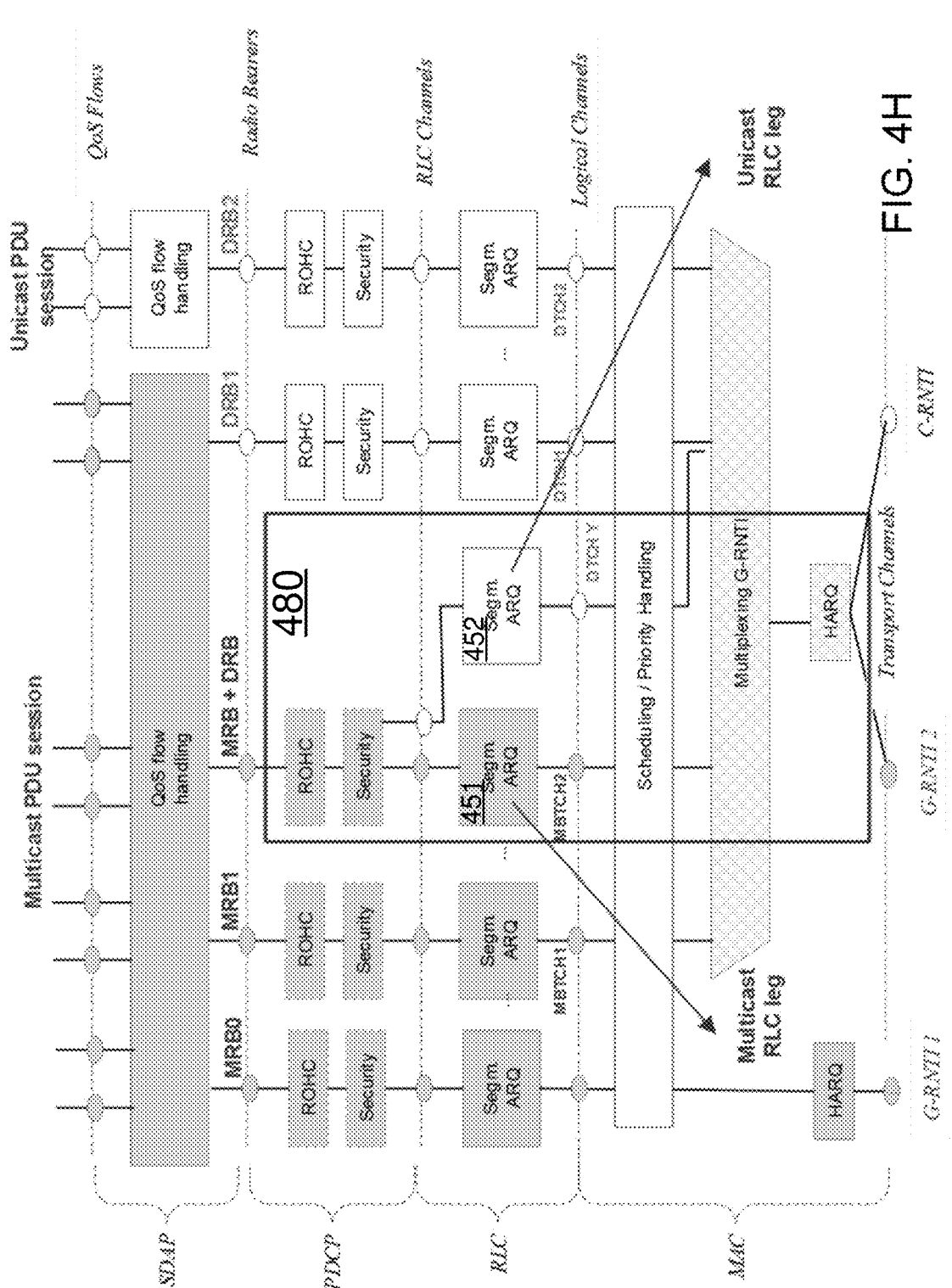
FIG. 4H is a base station architecture diagram for providing multicast sessions in accordance with various embodiments.

FIG. 4H illustrates an example architecture of a common PDCP entity 480 for MRB and DRB RLC legs according to various embodiments. With reference to FIGS. 1-4H, the common PDCP entity 480 is similar to PDCP entity 470, except that the MAC entity supports sharing of a G-RNTI and C-RNTI for a HARQ process for multicast packets. The MAC entity may enable mixed HARQ operations for MRB and DRB.

In various embodiments, the common PDCP entity 480 may interface with the multicast RLC entity 451 such that the multicast RLC entity may operate in either AM or UM. The multicast RLC entity 451 may be have a single LCID (e.g., LCID MBTCH2 in FIG. 4H). RLC re-transmission may be supported. That single LCID (e.g., LCID MBTCH 2) of the multicast RLC entity 451 may be used for multicast and may be associated with the G-RNTI for HARQ operations or the C-RNTI for HARQ operations. A MAC level decision may determine whether retransmission proceeds through the multicast G-RNTI, such as via the multicast channel, or through the unicast C-RNTI, such as via the unicast channel. The unicast RLC entity 452 may have its own respective LCID (e.g., a second LCID DTCHY). The LCID of the unicast RLC entity 452 may be associated with the C-RNTI for HARQ operations. The configuration of the unicast RLC entity 452 in AM or UM may be a configuration selection. In some embodiments, within a multicast HARQ process, G-RNTI may be used for HARQ operations in the initial Tx of a PDCP PDU and HARQ re-transmission operation may use G-RNTI or C-RNTI for multicast re-transmission. In various embodiments, soft combining of original HARQ transmissions using G-RNTI and re-transmissions using C-RNTI may be supported.

The architecture of FIG. 4H is similar to FIG. 4G, but a key difference is how HARQ may be used in FIG. 4H. The multicast RLC entity 451 is associated with single multicast LCID in all modes in the architecture in FIG. 4H. Multicast RLC data may be transmitted using HARQ process, which may use either G-RNTI, C-RNTI, or mixed G-RNTI and C-RNTI in any manner. The use of the G-RNTI in HARQ operations may result in all wireless devices of the group being able to decode and C-RNTI may result in only targeted wireless devices being able to decode. For unicast RLC data, HARQ may be associated with C-RNTI scrambling only.

For FIG. 4H's architecture, the multicast RLC entity 451 may be configured in AM mode and associated with one Multicast LCID. Multicast RLC leg re-transmission may be based on a multicast HARQ process where the base station (e.g., gNB) may flexibly use either G-RNTI or C-RNTI scrambling for HARQ transmission. For example, for an initial Tx the encoding of the packet may be based on G-RNTI scrambling and retransmission may be either by C-RNTI or G-RNTI scrambling. The multicast RLC entity 451 may be identified by either G-RNTI and the multicast LCID or C-RNTI and the multicast LCID.

In the architectures of FIGS. 4G and 4H, the PDCP entity is common for both MRB and DRBs. In the architectures of FIGS. 4G and 4H, the DRB RLC leg can be used for either initial transmission of multicast data for a specific wireless device or re-transmission of multicast data for a specific wireless device using the unicast RLC leg at the time of switching from MRB to DRB.

In various embodiments, such as the architectures illustrated in FIGS. 4G and 4H, the PDCP entity (e.g., PDCP entity 470, 480) may be common for both a MRB and DRB and the DRB RLC leg may be used for either initial transmission of multicast data for a specific wireless device or re-transmission of multicast data for a specific wireless device using the unicast RLC leg when switching from MRB to DRB.

In various embodiments, any HARQ transmit or HARQ retransmission from a unicast RLC leg may use only unicast HARQ, such as HARQ operations encoding a packet using C-RNTI and any HARQ transmit or HARQ retransmission from a multicast RLC leg may use either G-RNTI or C-RNTI for packet encoding in a flexible manner.

FIGS. 5A, 5B, 5C, 5D, 5E, 5F, 5G, 5H, 5I, 5J, and 5K illustrate operations of methods 500 for supporting retransmission in a multicast session in a Fifth Generation (5G) New Radio (NR) (5G NR) radio access network (RAN) in accordance with various embodiments. The operations of method 500 presented below are intended to be illustrative. In some embodiments, method 500 may be accomplished with one or more additional operations not described, and/or without one or more of the operations discussed. Additionally, the order in which the operations of the method 500 are illustrated in FIGS. 5A, 5B, 5C, 5D, 5E, 5F, 5G, 5H, 5I, 5J, and 5K and described below is not intended to be limiting.

In some embodiments, method 500 may be implemented in one or more processors (e.g., a digital processor, an analog processor, a digital circuit designed to process information, an analog circuit designed to process information, a state machine, and/or other mechanisms for electronically processing information) of a wireless device (e.g., the wireless device 120a-120e, 200, 320, 415). The one or more processors may include one or more devices executing some or all of the operations of method 500 in response to instructions stored electronically on an electronic storage medium. The one or more processors may include one or more devices configured through hardware, firmware, and/or software to be specifically designed for execution of one or more of the operations of method 500. For example, with reference to FIGS. 1-5A, 5B, 5C, 5D, 5E, 5F, 5G, 5H, 5I, 5J, and 5K, the operations in the method 500 may be performed by a wireless device (e.g., the wireless device 120a-120e, 200,

320, 415). As specific examples, the operations 500 may be performed by a PDCP entity (e.g., PDCP entity 450, 470, 480 running on a wireless device (e.g., the wireless device 120a-120e, 200, 320, 415).

FIG. 5A illustrates a method 500 that may be performed by a processor of a wireless device in accordance with various embodiments.

In block 502, the processor may perform operations including determining whether a PDCP status reporting condition for the multicast session has occurred. In various embodiments, a PDCP status reporting condition for the multicast session may include receiving a PDCP PDU including a polling bit from the base station of the 5G NR RAN. In some embodiments, the PDCP PDU including the polling bit may be received via the unicast transport channel. In some embodiments, the PDCP PDU including the polling bit may be received via the multicast transport channel. In various embodiments, the PDCP PDU including the polling bit may include a sub-group identifier, and determining whether the PDCP status reporting condition for the multi-cast session has occurred may include determining whether the sub-group identifier corresponds to a sub-group identifier configured to the wireless device. In various embodiments, the PDCP status reporting condition for the multicast session may include a countdown timer associated with PDCP status reporting expiring.

In block 504, the processor may perform operations including generating a PDCP status report indicating at least an FMC of a next not received PDCP PDU for the multicast session in response to determining that the PDCP status reporting condition for the multicast session has occurred.

In block 506, the processor may perform operations including sending the PDCP status report to a base station of a 5G NR RAN.

FIG. 5B illustrates additional or alternative operations that may be performed by the processor as part of the method 500 in accordance with some embodiments.

In block 508, the processor may perform operations including receiving a retransmitted PDCP PDU from the base station of the 5G NR RAN via a unicast transport channel or a multicast transport channel. The retransmitted PDCP PDU may correspond to the next not received PDCP PDU. In some embodiments, the next not received PDPC PDU was scheduled to be received via the multicast transport channel and the retransmitted PDCP PDU may be received via the multicast transport channel. In some embodiments, the next not received PDPC PDU was scheduled to be received via the multicast transport channel, and the retransmitted PDCP PDU may be received via the unicast transport channel.

Figure 5C:
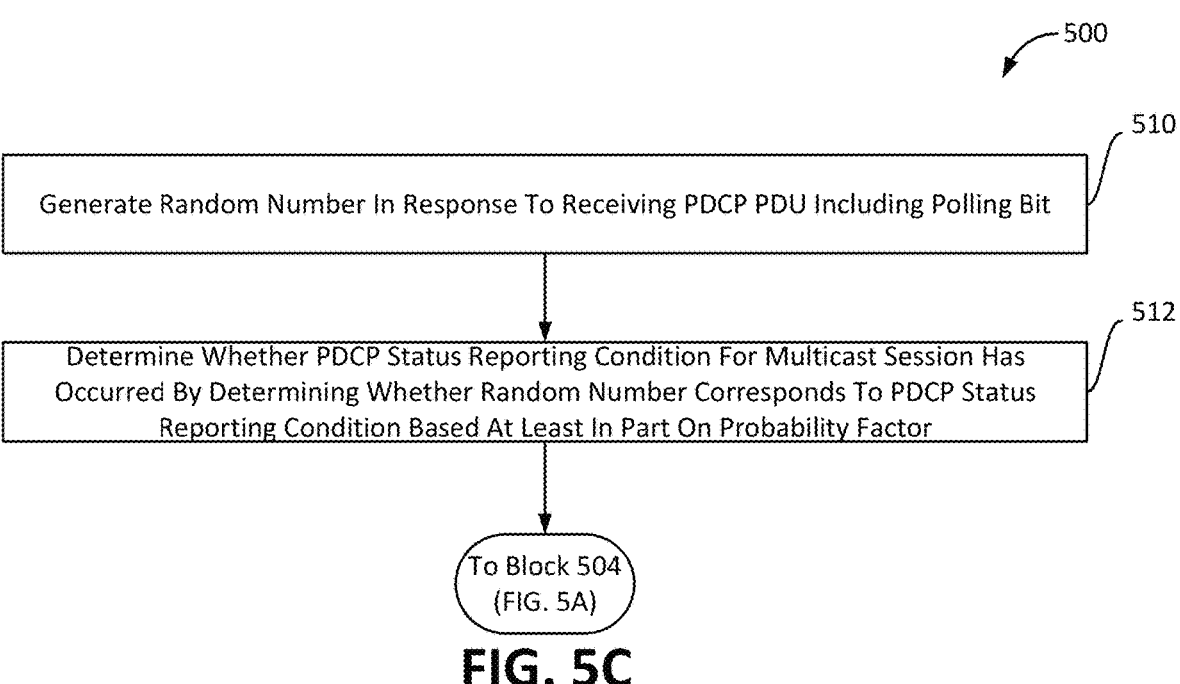
FIGS. 5A, 5B, 5C, 5D, 5E, 5F, 5G, 5H, 5I, 5J, and/or 5K, are process flow diagrams illustrating methods that may be performed by a wireless device for supporting PDCP retransmission in a 5G NR RAN in accordance with various embodiments.

FIG. 5C illustrates additional or alternative operations that may be performed by the processor as part of the method 500 in accordance with some embodiments.

In block 510, the processor may perform operations including generating a random number in response to receiving a PDCP PDU including a polling bit. In various embodiments, a probability factor may be configured as part of MRB PDCP configuration. The generated random number may be used with the probability factor to determine whether the wireless device should or should not send a PDCP status report.

In block 512, the processor may perform operations including determining whether the PDCP status reporting condition for the multicast session has occurred by determining whether the random number corresponds to the PDCP status reporting condition based at least in part on the probability factor.

Figure 5D:
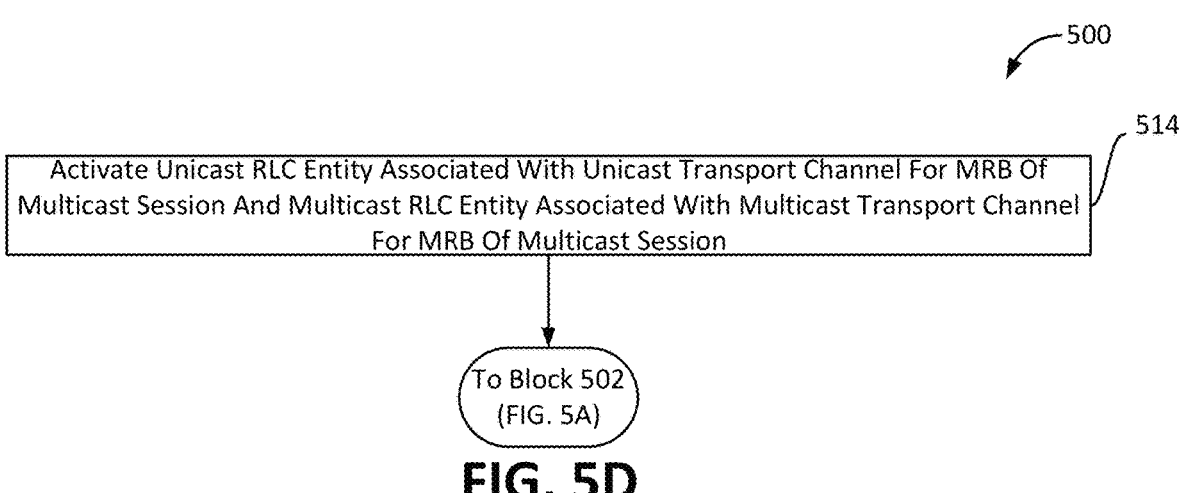

FIG. 5D illustrates additional or alternative operations that may be performed by the processor as part of the method 500 in accordance with some embodiments.

In block 514, the processor may perform operations including activating a unicast RLC entity associated with the unicast transport channel for an MRB of the multicast session and a multicast RLC entity associated with the multicast transport channel for the MRB of the multicast session. In various embodiments, the unicast RLC entity may operate in an acknowledge mode (AM) or an unac-knowledged mode (UM), and the multicast RLC entity may operate in an UM or a transparent mode TM.

Figure 5E:
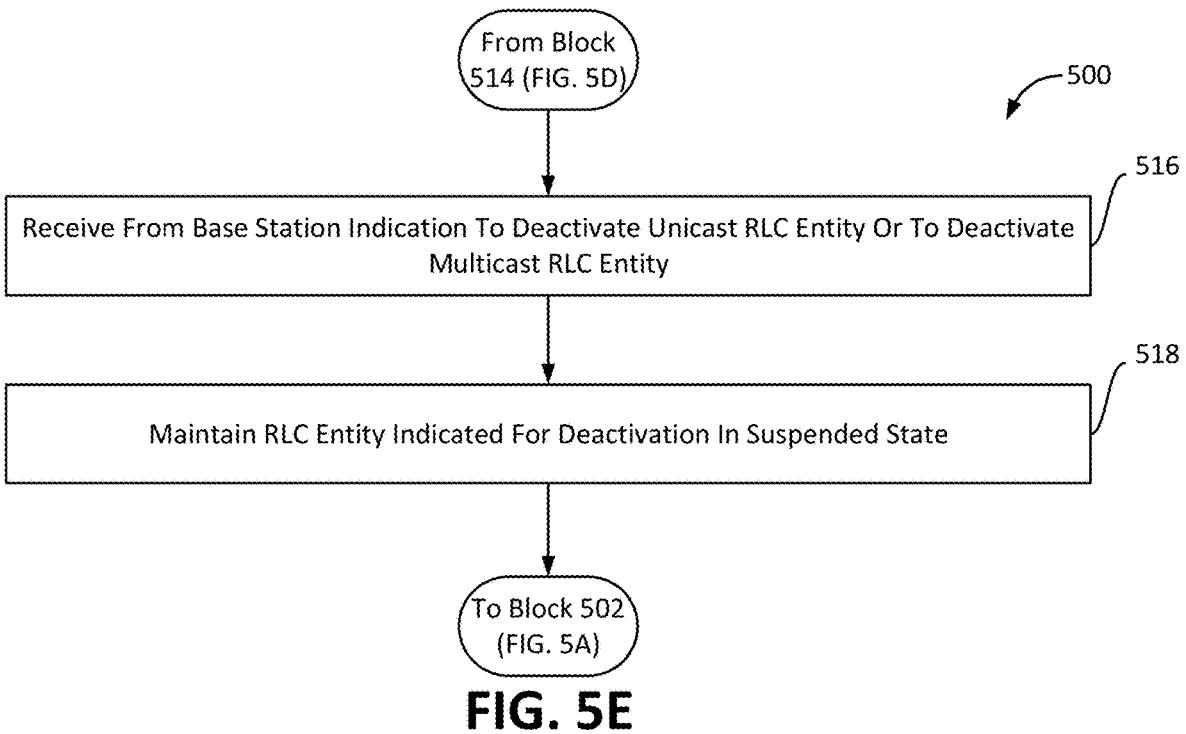

FIG. 5E illustrates additional or alternative operations that may be performed by the processor as part of the method 500 in accordance with some embodiments.

In block 516, the processor may perform operations including receiving from the base station an indication to deactivate the unicast RLC entity or to deactivate the multicast RLC entity.

In block 518, the processor may perform operations including maintaining the RLC entity indicated for deacti-vation in a suspended state.

Figure 5F:
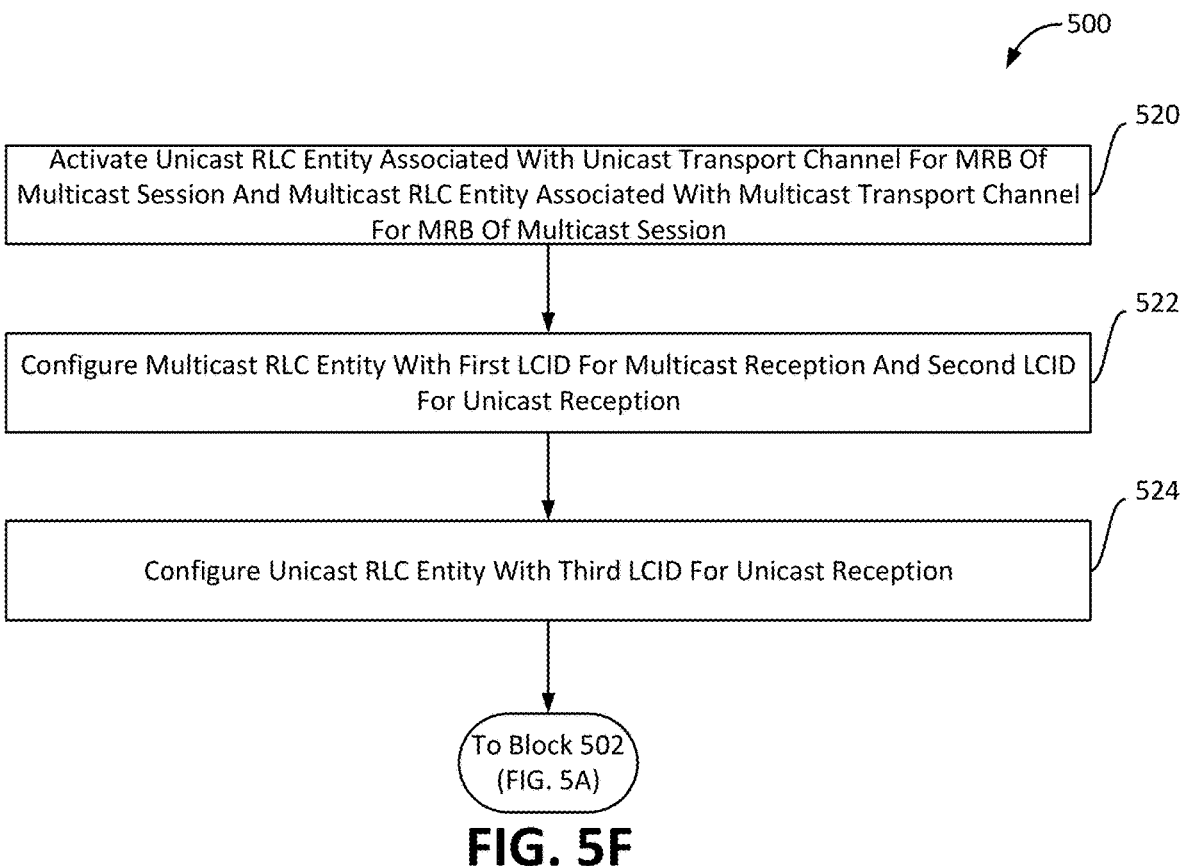

FIG. 5F illustrates additional or alternative operations that may be performed by the processor as part of the method 500 in accordance with some embodiments.

In block 520, the processor may perform operations including activating a unicast RLC entity associated with the unicast transport channel for an MRB of the multicast session and a multicast RLC entity associated with the multicast transport channel for the MRB of the multicast session. The multicast RLC may operate in an AM.

In block 522, the processor may perform operations including configuring the multicast RLC entity with a first LCID for multicast reception and a second LCID for unicast reception.

In block 524, the processor may perform operations including configuring the unicast RLC entity with a third LCID for unicast reception.

Figure 5G:
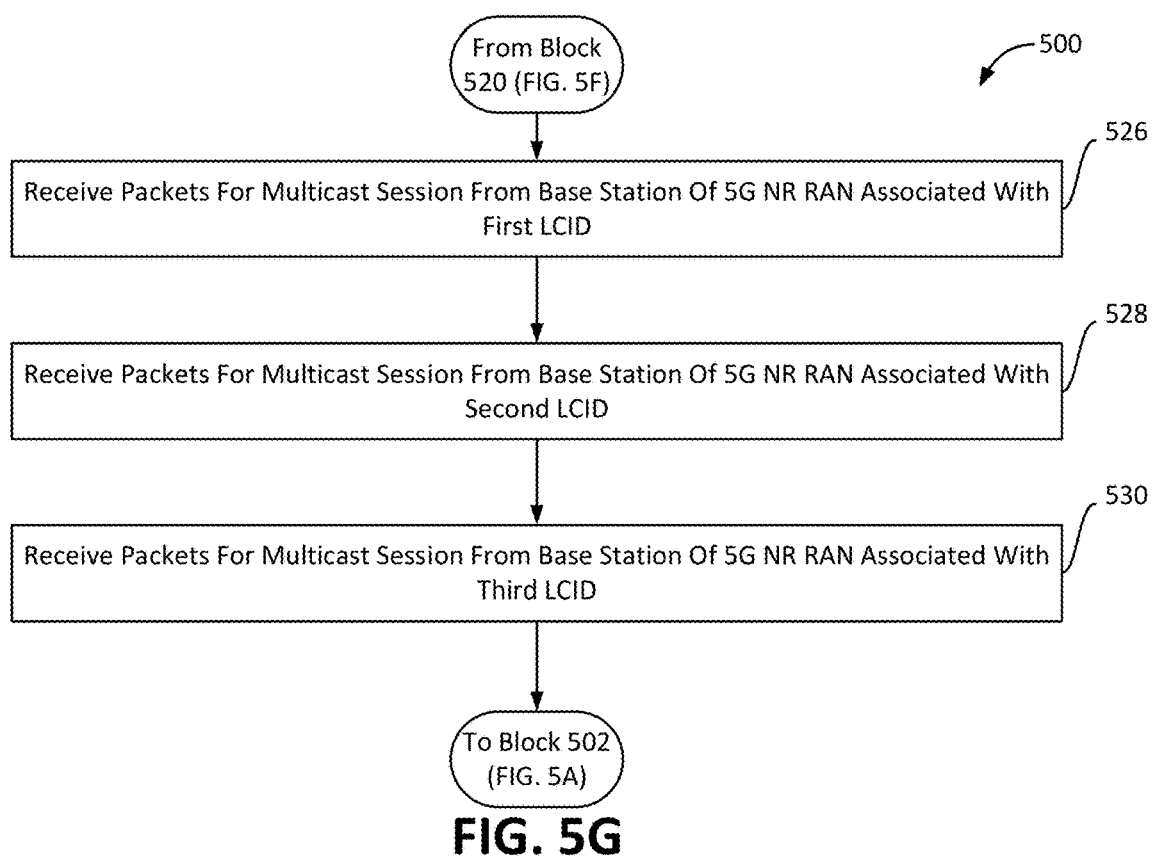

FIG. 5G illustrates additional or alternative operations that may be performed by the processor as part of the method 500 in accordance with some embodiments.

In block 526, the processor may perform operations including receiving packets for the multicast session from the base station of the 5G NR RAN associated with the first LCID. The packets may be HARQ encoded with the first LCID and a G-RNTI.

In block 528, the processor may perform operations including receiving packets for the multicast session from the base station of the 5G NR RAN associated with the second LCID. The packets may be HARQ encoded with the second LCID and a C-RNTI.

In block 530, the processor may perform operations including receiving packets for the multicast session from the base station of the 5G NR RAN associated with the third LCID. The packets may be HARQ encoded with the third LCID and the C-RNTI.

Figure 5H:
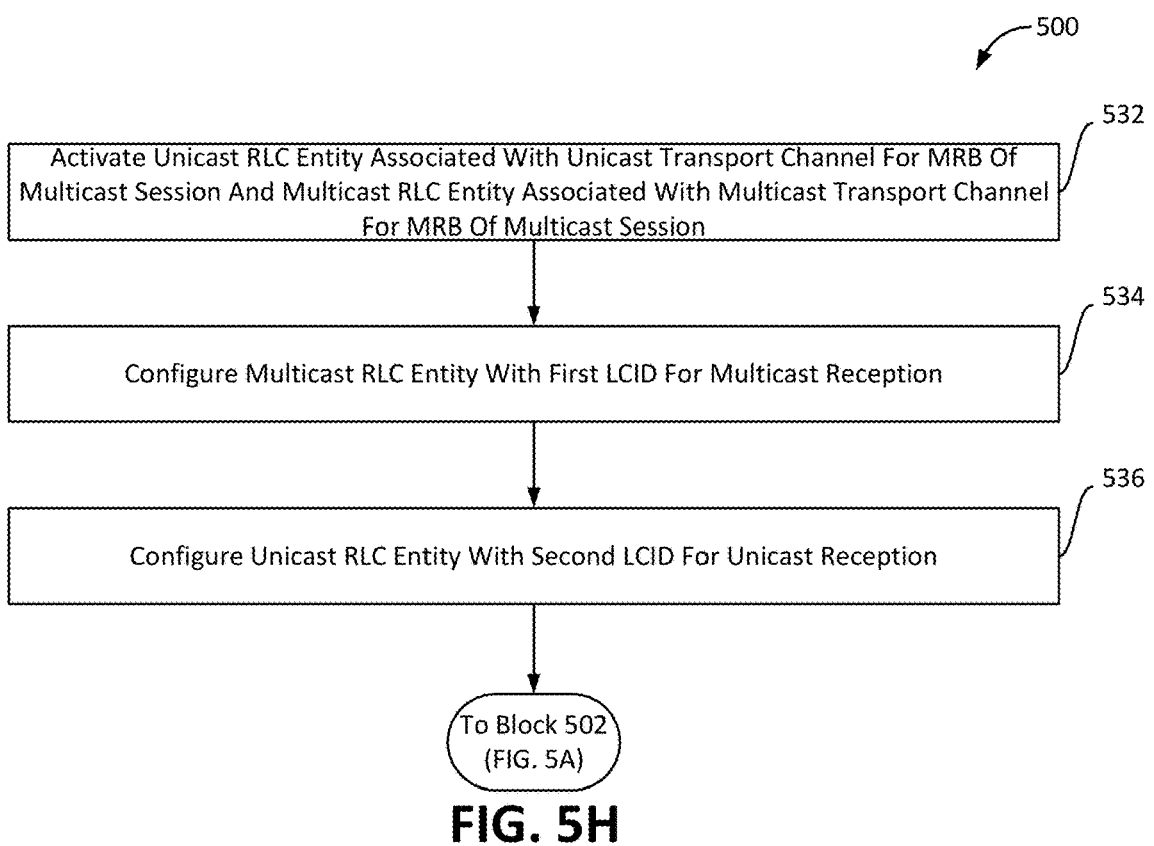

FIG. 5H illustrates additional or alternative operations that may be performed by the processor as part of the method 500 in accordance with some embodiments.

In block 532, the processor may perform operations including activating a unicast RLC entity associated with the unicast transport channel for an MRB of the multicast session and a multicast RLC entity associated with the multicast transport channel for the MRB of the multicast session. The multicast RLC may operate in an UM.

In block 534, the processor may perform operations including configuring the multicast RLC entity with a first LCID for multicast reception.

In block 536, the processor may perform operations including configuring the unicast RLC entity with a second LCID for unicast reception.

Figure 5I:
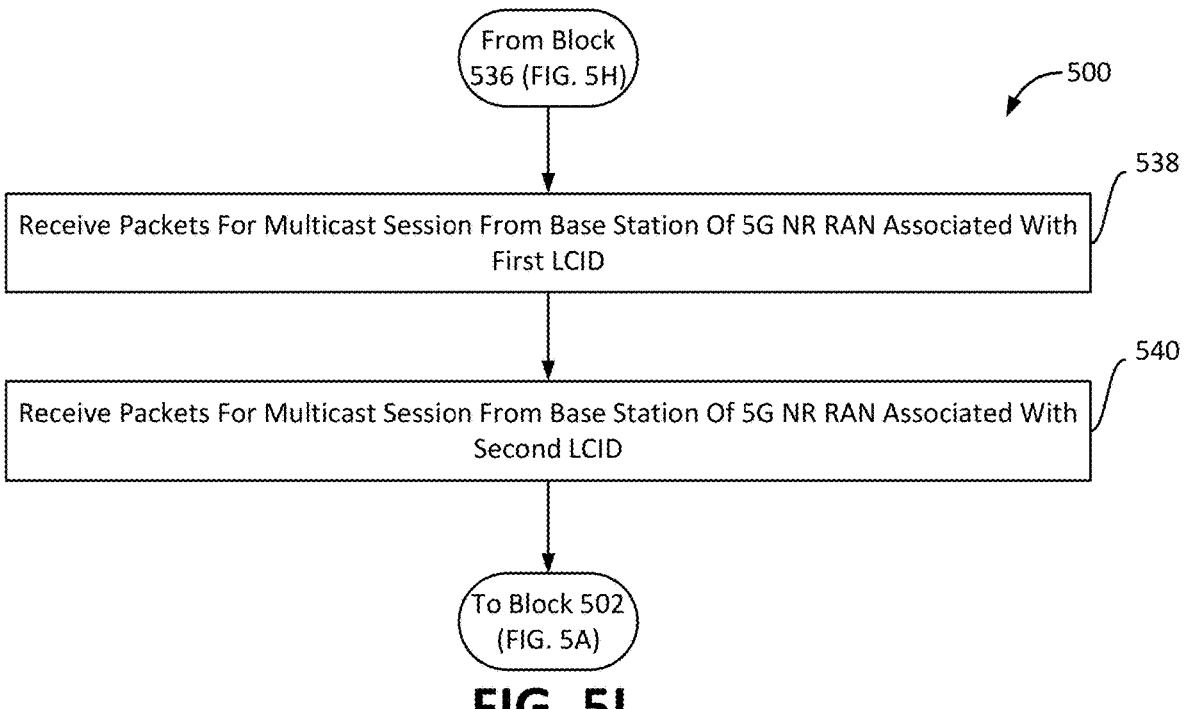

FIG. 5I illustrates additional or alternative operations that may be performed by the processor as part of the method 500 in accordance with some embodiments.

In block 538, the processor may perform operations including receiving packets for the multicast session from the base station of the 5G NR RAN associated with the first LCID. The packets may be HARQ encoded with the first LCID and a G-RNTI.

In block 540, the processor may perform operations including receiving packets for the multicast session from the base station of the 5G NR RAN associated with the second LCID. The packets may be HARQ encoded with the second LCID and a C-RNTI.

Figure 5J:
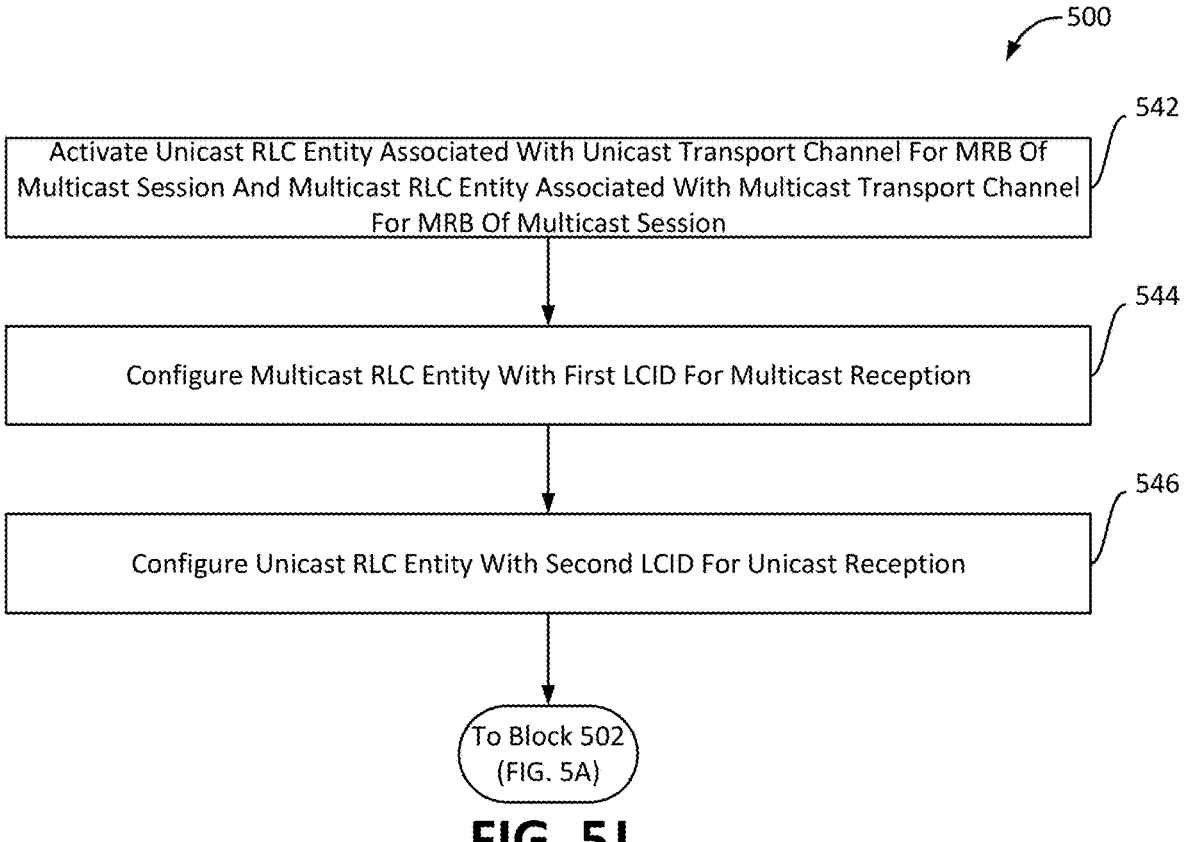

FIG. 5J illustrates additional or alternative operations that may be performed by the processor as part of the method 500 in accordance with some embodiments.

In block 542, the processor may perform operations including activating a unicast RLC entity associated with the unicast transport channel for an MRB of the multicast session and a multicast RLC entity associated with the multicast transport channel for the MRB of the multicast session. The multicast RLC may operate in an AM or an UM and the unicast RLC may operate in an AM or an UM.

In block 544, the processor may perform operations including configuring the multicast RLC entity with a first LCID for multicast reception.

In block 546, the processor may perform operations including configuring the unicast RLC entity with a second LCID for unicast reception.

Figure 5K:
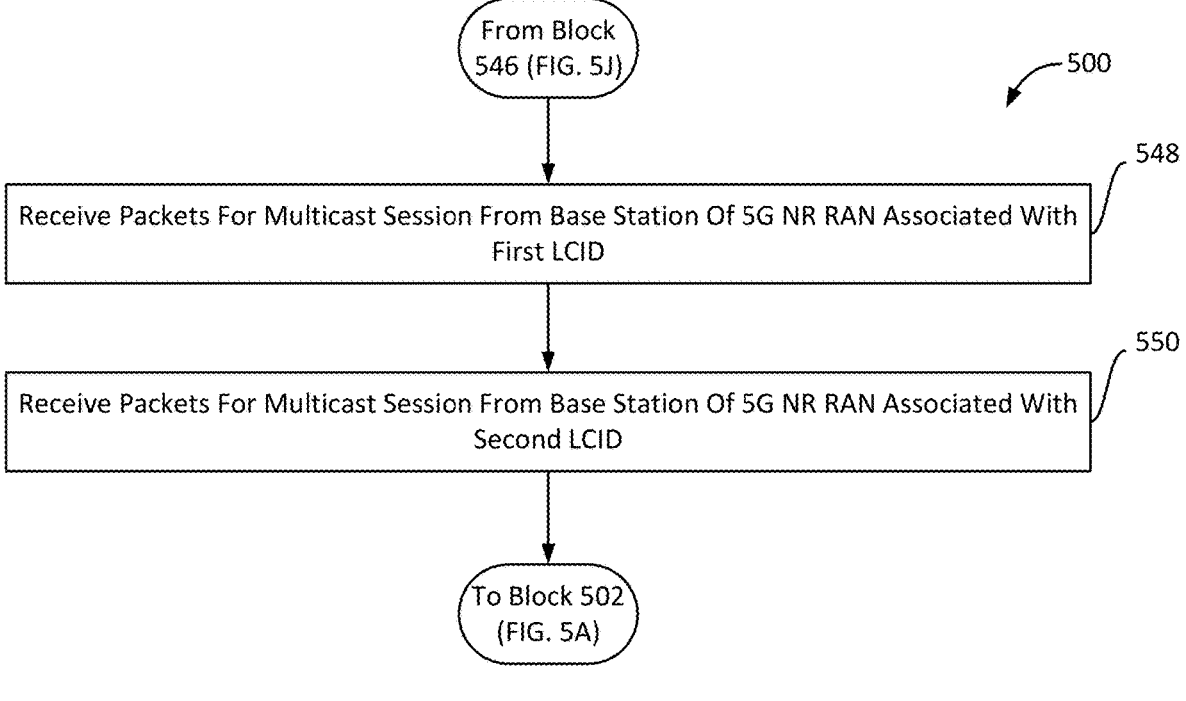

FIG. 5K illustrates additional or alternative operations that may be performed by the processor as part of the method 500 in accordance with some embodiments.

In block 548, the processor may perform operations including receiving packets for the multicast session from the base station of the 5G NR RAN associated with the first LCID. The packets may be HARQ encoded with the first LCID and a G-RNTI or the packets are HARQ encoded with the first LCID and a C-RNTI.

In block 550, the processor may perform operations including receiving packets for the multicast session from the base station of the 5G NR RAN associated with the second LCID. The packets may be HARQ encoded with the second LCID and the C-RNTI.

Figure 6A:
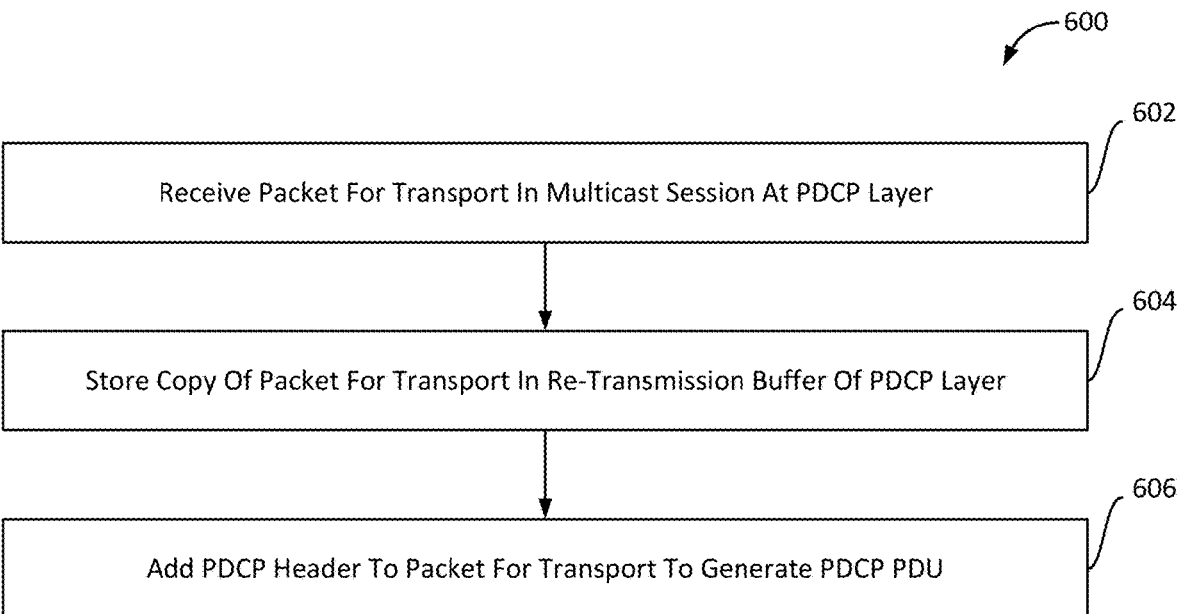
FIGS. 6A, 6B, 6C, 6D, 6E, 6F, 6G, 6H, 6I, 6J, 6K, 6L, 6M, and/or 6N are process flow diagram illustrating methods that may be performed by a base station for supporting PDCP retransmission in a 5G NR RAN in accordance with various embodiments.

FIG. 6A illustrates a method 600, and FIGS. 6B, 6C, 6D, 6E, 6F, 6G, 6H, 6I, 6J, 6K, 6L, 6M, and/or 6N illustrate alternative or additional operations of the method 600 that may be performed by a processor of a base station for supporting retransmission in a multicast session in a Fifth Generation (5G) New Radio (NR)(5G NR) radio access network (RAN) in accordance with various embodiments. The operations of method 600 presented below are intended to be illustrative. In some embodiments, method 500 may be accomplished with one or more additional operations not described, and/or without one or more of the operations discussed. Additionally, the order in which the operations of method 600 are illustrated in FIGS. 6A, 6B, 6C, 6D, 6E, 6F, 6G, 6H, 6I, 6J, 6K, 6L, 6M, and/or 6N and described below is not intended to be limiting.

The operations in the method 600 may be implemented in one or more processors of a base station, such as a digital processor, an analog processor, a digital circuit designed to process information, an analog circuit designed to process information, a state machine, and/or other mechanisms for electronically processing information. The one or more processors may include one or more devices executing some or all of the operations of method 600 in response to instructions stored electronically on an electronic storage medium. The one or more processors may include one or more devices configured through hardware, firmware, and/or software to be specifically designed for execution of one or more of the operations of method 600. For example, with reference to FIGS. 1-6N, the operations of the method 600 may be performed by a processor of a base station (e.g., the base station 110*a-d*, 350, 401). As specific examples, the operations 500 may be performed by a PDCP entity (e.g., PDCP entity 450, 470, 480 running on a processor of a base station (e.g., the base station 110*a-d*, 350, 401).

FIG. 6A illustrates method 500, in accordance with various embodiments.

In block 602, the processor may perform operations including receiving a packet for transport in the multicast session at a PDCP layer.

In block 604, the processor may perform operations including storing a copy of the packet for transport in a re-transmission buffer of the PDCP layer.

In block 606, the processor may perform operations including adding a PDCP header to the packet for transport to generate a PDCP PDU.

Figure 6B:
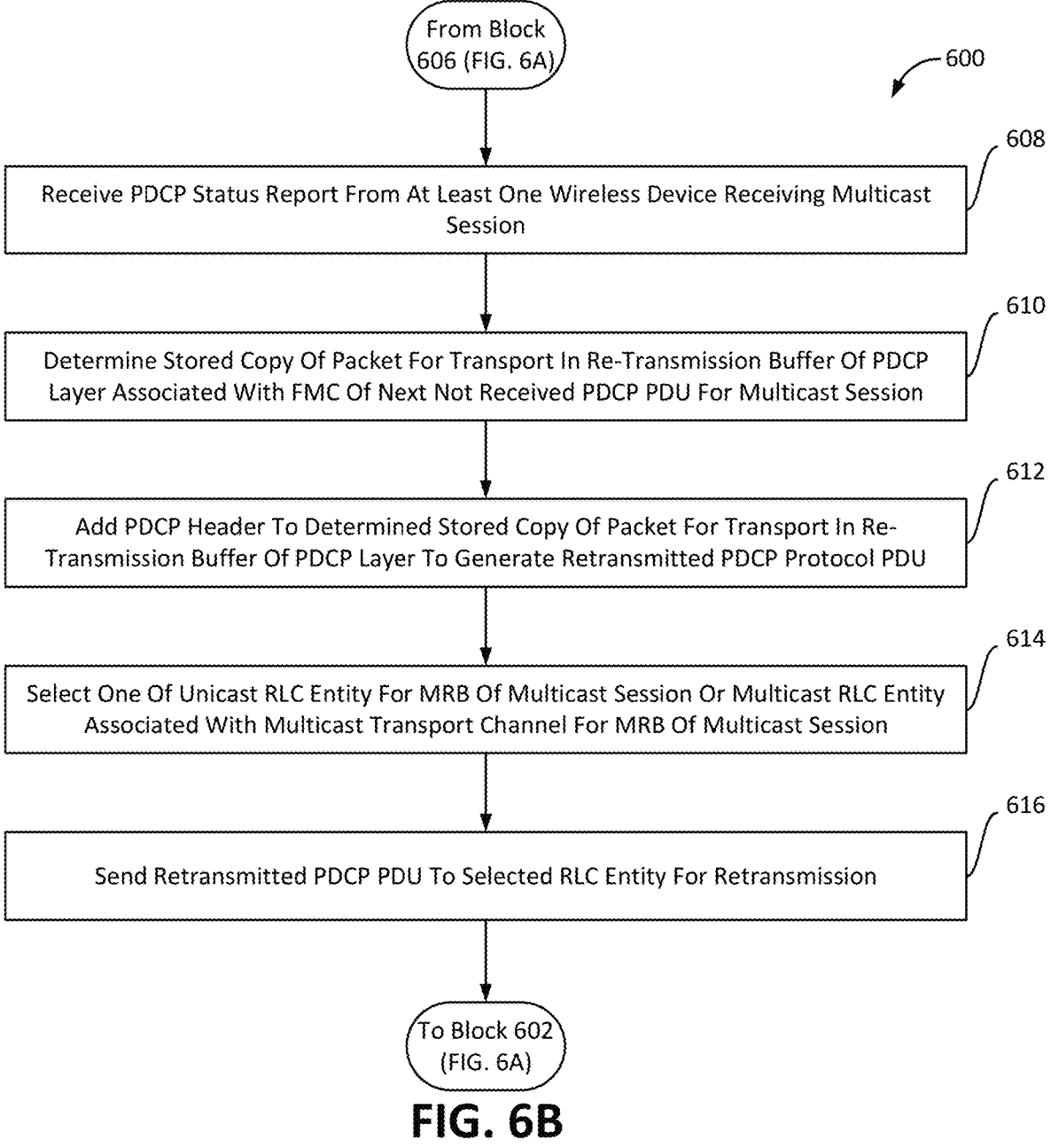

Referring to FIG. 6B, in block 608, the processor may perform operations including receiving a PDCP status report from at least one wireless device receiving the multicast session. The PDCP status report may indicate at least an FMC of a next not received PDCP PDU for the multicast session.

In block 610, the processor may perform operations including determining the stored copy of the packet for transport in the re-transmission buffer of the PDCP layer associated with the FMC of the next not received PDCP PDU for the multicast session.

In block 612, the processor may perform operations including adding a PDCP header to the determined stored copy of the packet for transport in the re-transmission buffer of the PDCP layer to generate a retransmitted PDCP protocol PDU.

In block 614, the processor may perform operations including selecting one of a unicast RLC entity for an MRB of the multicast session or a multicast RLC entity associated with a multicast transport channel for the MRB of the multicast session. In various embodiments, selecting one of the unicast RLC entity or the multicast RLC entity for retransmission may be based at least in part on a number of wireless devices requesting retransmission.

In block 616, the processor may perform operations including sending the retransmitted PDCP PDU to the selected RLC entity for retransmission.

Figure 6C:
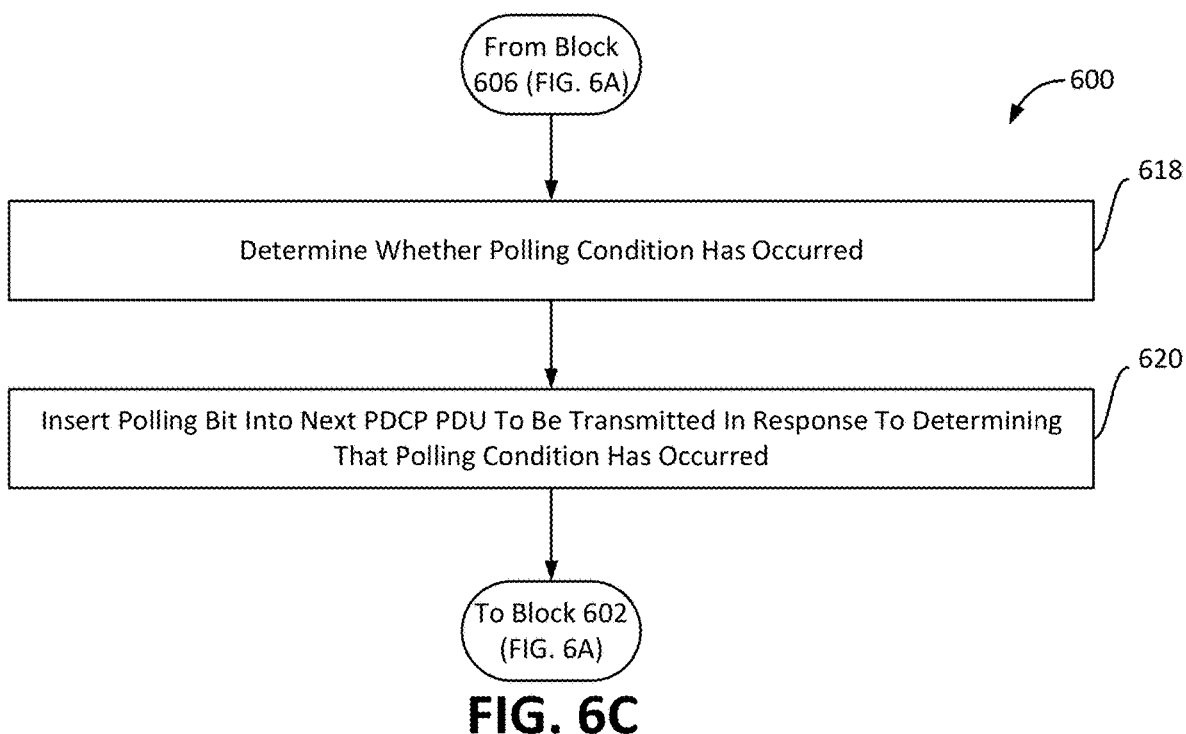

FIG. 6C illustrates additional or alternative operations that may be performed by the processor as part of the method 600 in accordance with some embodiments.

In block 618, the processor may perform operations including determining whether a polling condition has occurred. In some embodiments, the polling condition may be an expiration of a polling time. In some embodiments, the polling condition may be a number of PDCP PDUs sent reaching a threshold or a number of bytes of PDCP data sent reaching a threshold.

In block 620, the processor may perform operations including inserting a polling bit into a next PDCP PDU to be transmitted in response to determining that the polling condition has occurred.

Figure 6D:
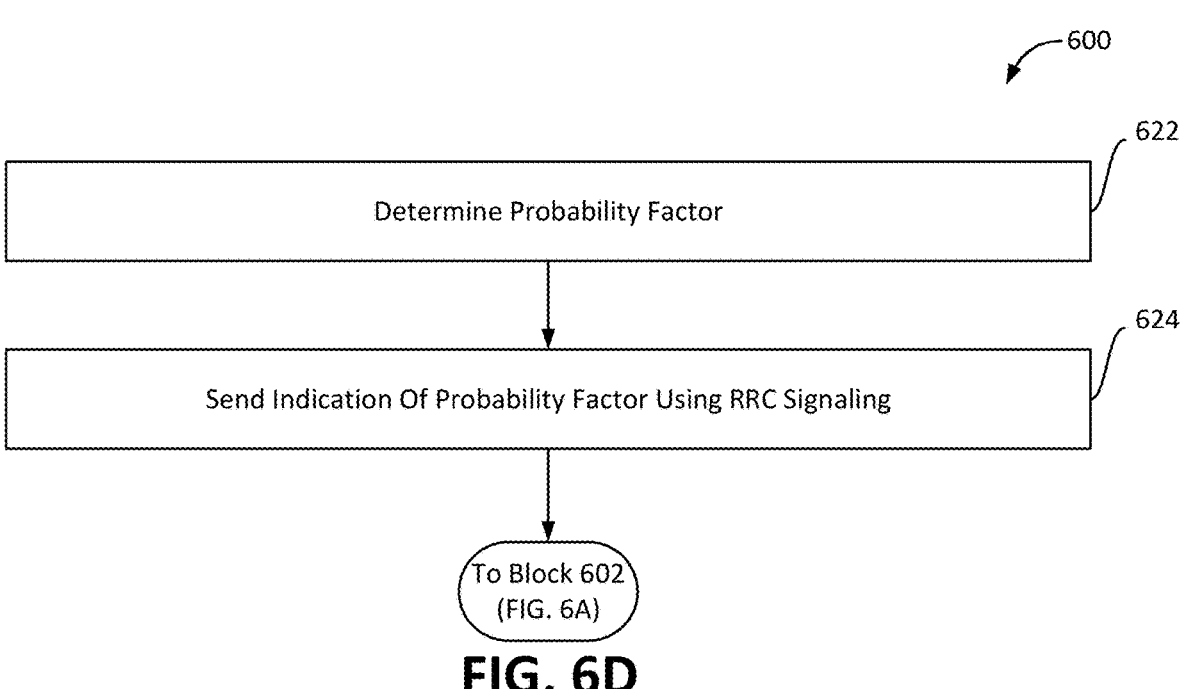

FIG. 6D illustrates additional or alternative operations that may be performed by the processor as part of the method 600 in accordance with some embodiments.

In block 622, the processor may perform operations including determining a probability factor.

In block 624, the processor may perform operations including sending an indication of the probability factor using RRC signaling.

FIG. 6E illustrates additional or alternative operations that may be performed by the processor as part of the method 600 in accordance with some embodiments.

In block 626, the processor may perform operations including determining a sub-group identifier of wireless devices selected to report PDCP status.

In block 628, the processor may perform operations including inserting the sub-group identifier into the next PDCP PDU to be transmitted in response to determining that the polling condition has occurred.

FIG. 6F illustrates additional or alternative operations that may be performed by the processor as part of the method 600 in accordance with some embodiments.

In block 630, the processor may perform operations including receiving the packet for transport in the multicast session at a PDCP entity associated with an MRB of the multicast session.

In block 632, the processor may perform operations including sending the PDCP PDU to an RLC entity associated with a unicast transport channel for the MRB of the multicast session or a multicast RLC entity associated with a multicast transport channel for the MRB of the multicast session.

FIG. 6G illustrates additional or alternative operations that may be performed by the processor as part of the method 600 in accordance with some embodiments.

In block 634, the processor may perform operations including applying HARQ operations separately to the unicast transport channel for the MRB of the multicast session and the multicast transport channel for the MRB of the multicast session.

FIG. 6H illustrates additional or alternative operations that may be performed by the processor as part of the method 600 in accordance with some embodiments.

In block 636, the processor may perform operations including receiving the packet for transport in the multicast session at a PDCP entity associated with both a multicast radio bearer of the multicast session and a data radio bearer of the multicast session.

FIG. 6I illustrates additional or alternative operations that may be performed by the processor as part of the method 600 in accordance with some embodiments.

Figure 6J:
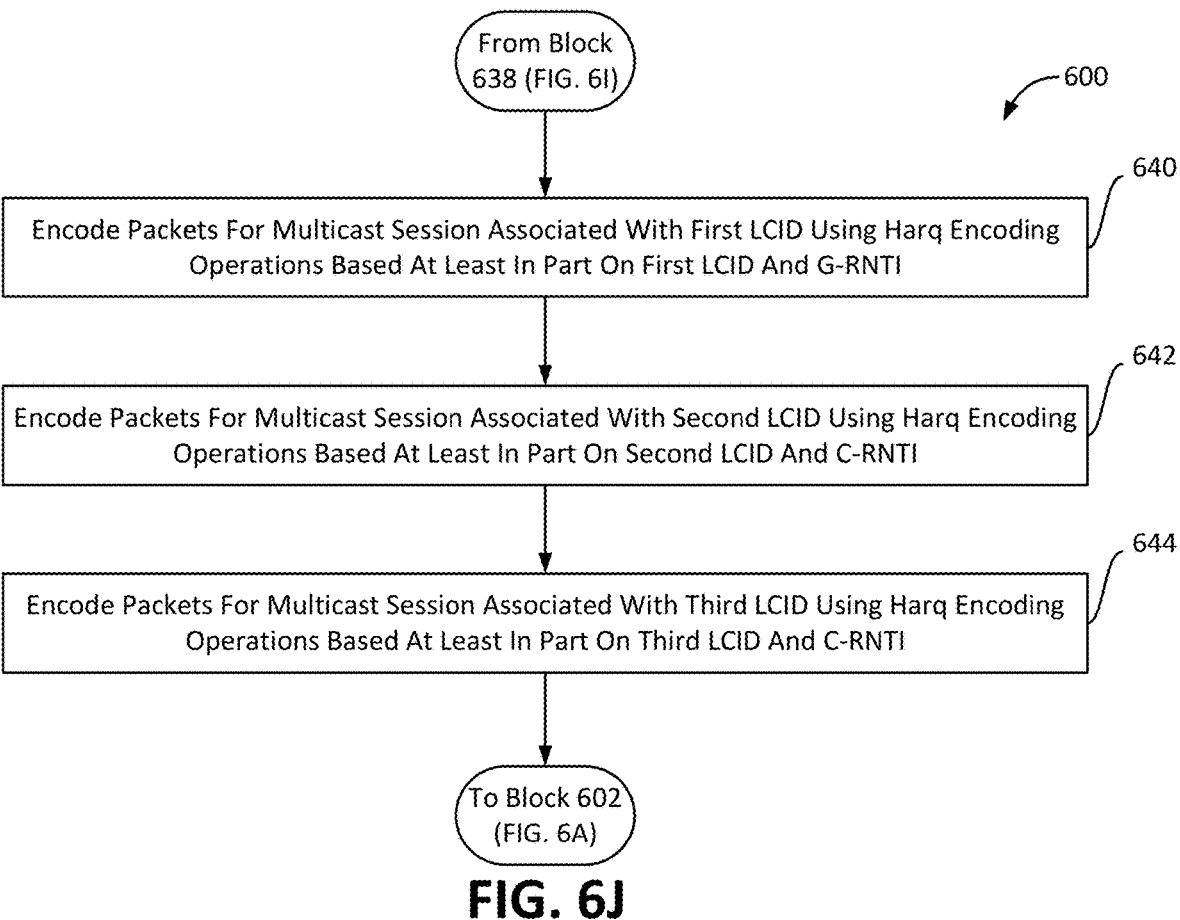

In block 638, the processor may perform operations including sending the PDCP PDU to a multicast radio link control entity associated with a first logical channel identifier for multicast transport and a second LCID for unicast transport or to a unicast RLC entity associated with a third LCID for unicast transport. In some embodiments, the multicast RLC entity operates in an acknowledge mode (AM) and the unicast RLC entity operates in an AM or unacknowledged mode (UM FIG. 6J illustrates additional or alternative operations that may be performed by the processor as part of the method 600 in accordance with some embodiments.

In block 640, the processor may perform operations including encoding packets for the multicast session associated with the first LCID using HARQ encoding operations based at least in part on the first LCID and a G-RNTI.

In block 642, the processor may perform operations including encoding packets for the multicast session associated with the second LCID using HARQ encoding operations based at least in part on the second LCID and a C-RNTI.

In block 644, the processor may perform operations including encoding packets for the multicast session associated with the third LCID using HARQ encoding operations based at least in part on the third LCID and the C-RNTI.

Figure 6K:
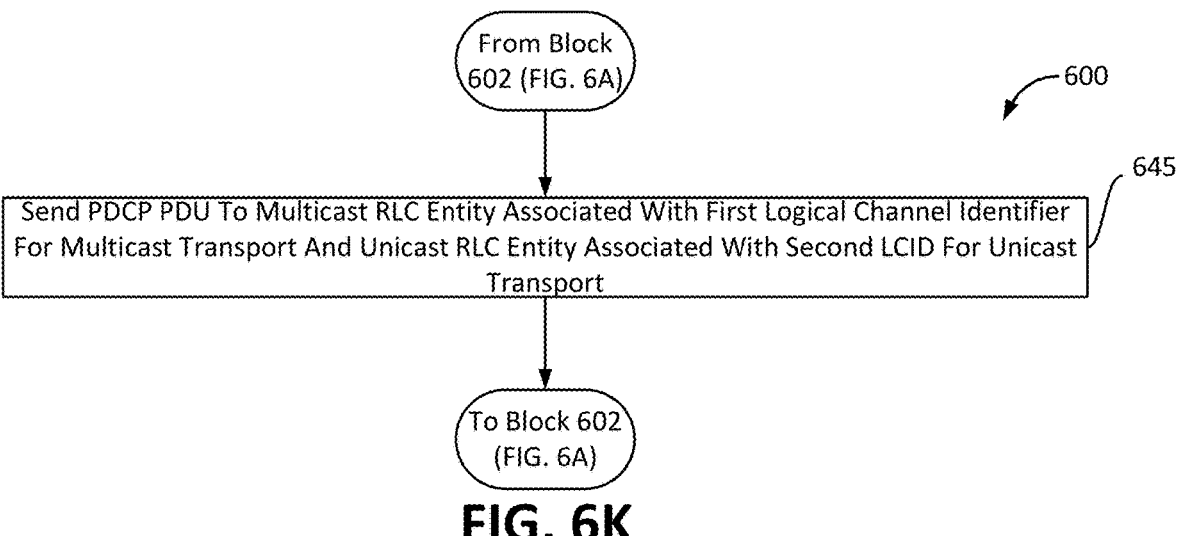

FIG. 6K illustrates additional or alternative operations that may be performed by the processor as part of the method 600 in accordance with some embodiments.

In block 645, the processor may perform operations including sending the PDCP PDU to a multicast RLC entity associated with a first logical channel identifier for multicast transport and a unicast RLC entity associated with a second LCID for unicast transport. In some embodiments, the multicast RLC entity operates in an unacknowledged mode (UM) and the unicast RLC entity operates in an acknowledge mode (AM) or UM.

Figure 6L:
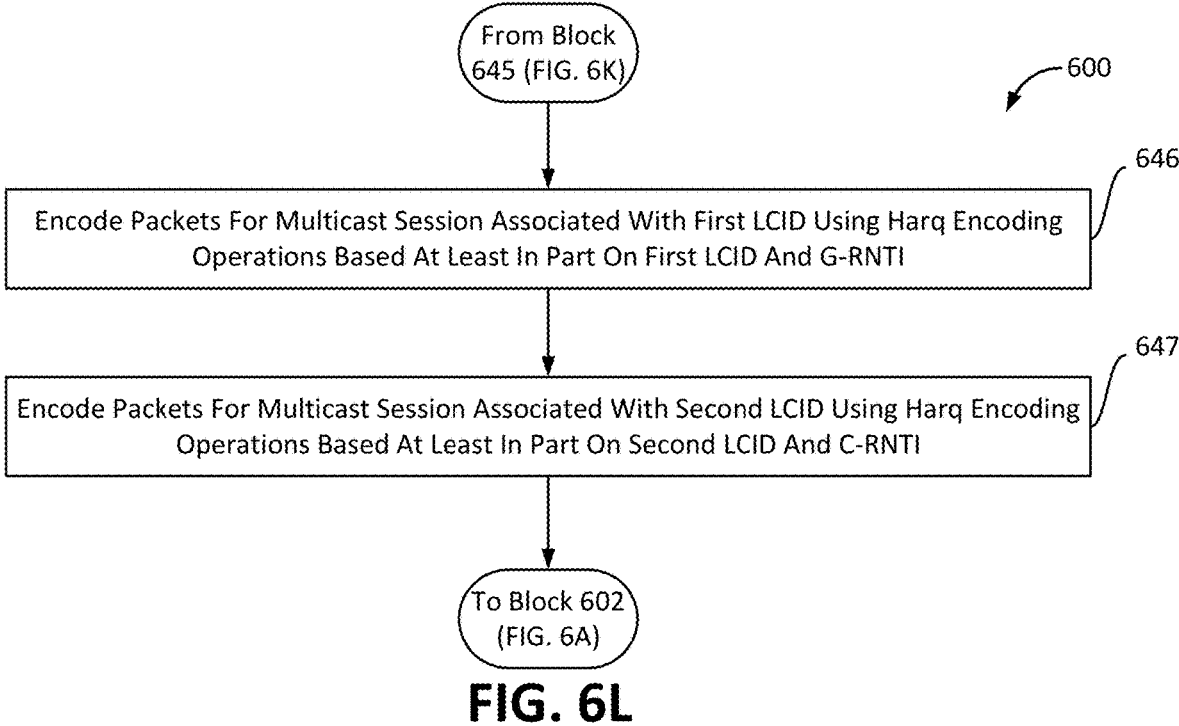

FIG. 6L illustrates additional or alternative operations that may be performed by the processor as part of the method 600 in accordance with some embodiments.

In block 646, the processor may perform operations including encoding packets for the multicast session associated with the first LCID using HARQ encoding operations based at least in part on the first LCID and a G-RNTI.

In block 647, the processor may perform operations including encoding packets for the multicast session associated with the second LCID using HARQ encoding operations based at least in part on the second LCID and a C-RNTI.

Figure 6M:
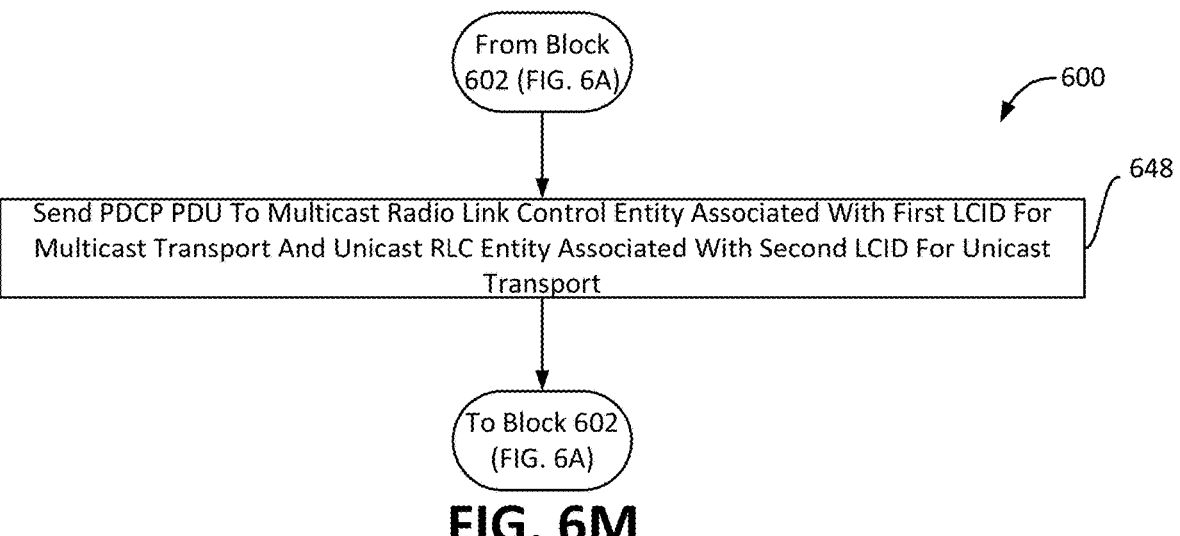

FIG. 6M illustrates additional or alternative operations that may be performed by the processor as part of the method 600 in accordance with some embodiments.

In block 648, the processor may perform operations including sending the PDCP PDU to a multicast radio link control entity associated with a first LCID for multicast transport and a unicast RLC entity associated with a second LCID for unicast transport. In some embodiments, the multicast RLC entity and the unicast RLC entity operate in an acknowledge mode (AM) or an unacknowledged mode (UM).

Figure 6N:
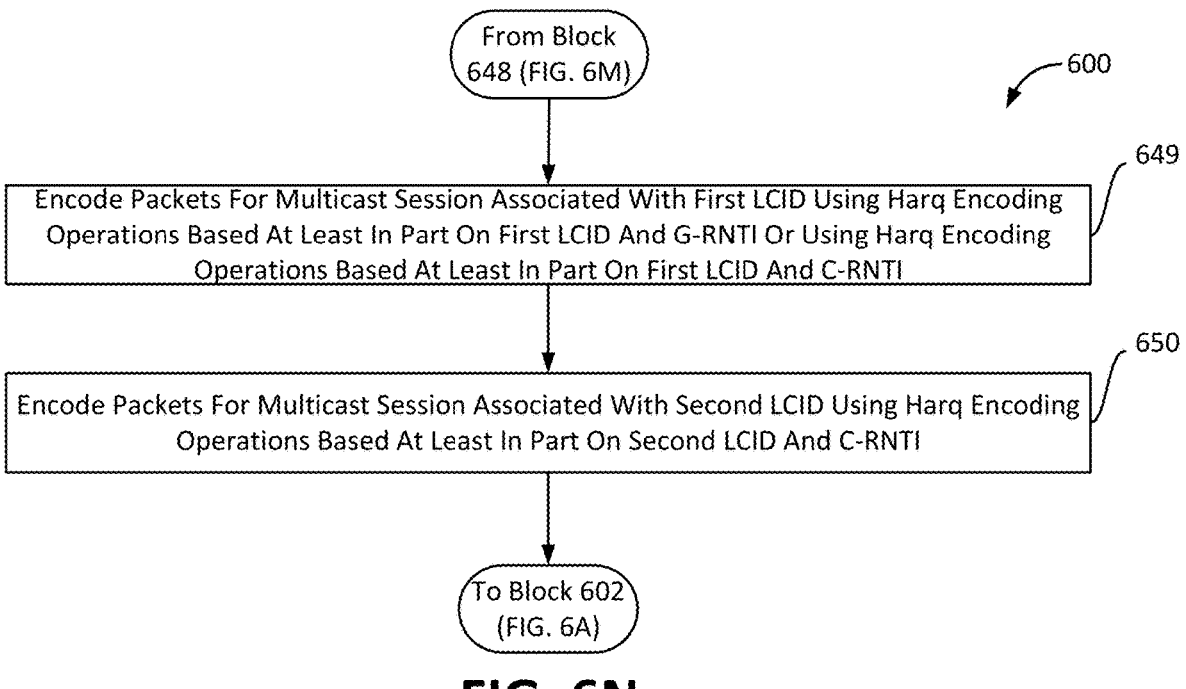

FIG. 6N illustrates additional or alternative operations that may be performed by the processor as part of the method 600 in accordance with some embodiments.

In block 649, the processor may perform operations including encoding packets for the multicast session associated with the first LCID using HARQ encoding operations based at least in part on the first LCID and a G-RNTI or using HARQ encoding operations based at least in part on the first LCID and a C-RNTI.

In block 650, the processor may perform operations including encoding packets for the multicast session associated with the second LCID using HARQ encoding operations based at least in part on the second LCID and the C-RNTI. In various embodiments, a packet originally encoded for the multicast session associated with the first LCID using HARQ encoding operations based at least in part on the first LCID and the G-RNTI is retransmitted as a packet encoded using HARQ encoding operations based at least in part on the first LCID and the C-RNTI.

Figure 7:
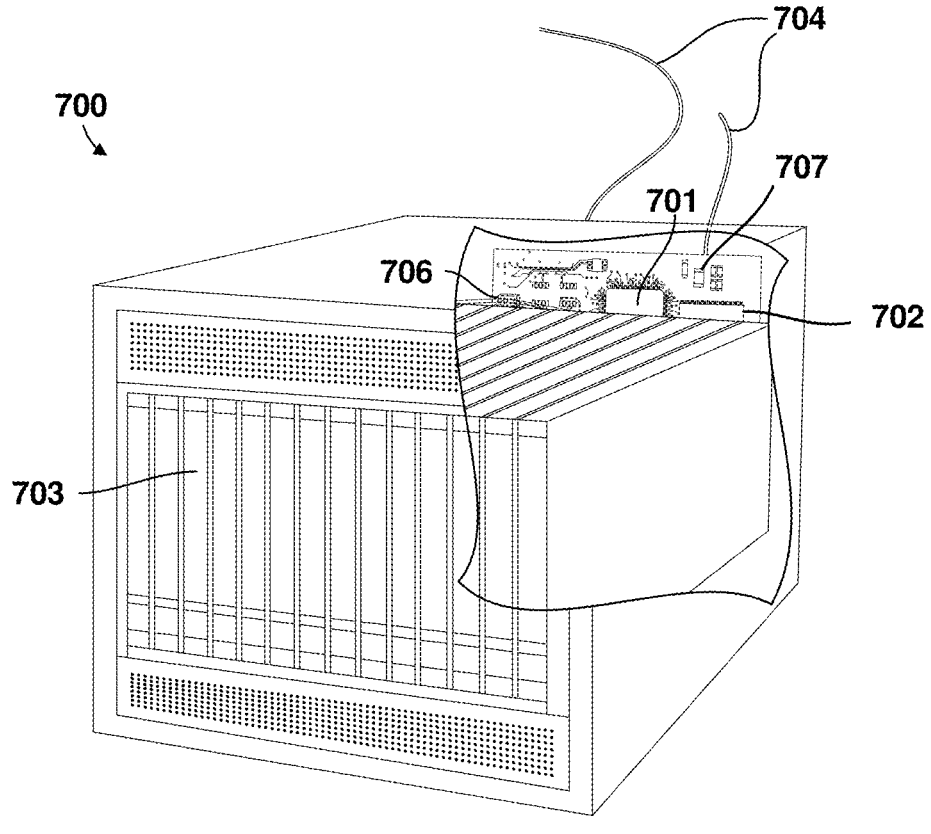
FIG. 7 is a component block diagram of a network computing device suitable for use with various embodiments.

FIG. 7 is a component block diagram of a network computing device 700, such as a base station (e.g., base station 110a-d, 350), suitable for use with various embodiments. Such network computing devices (e.g., base stations, such as gNBs, eNBs, etc.) may include at least the components illustrated in FIG. 7. With reference to FIGS. 1-6, the network computing device 700 may include a processor 701 coupled to volatile memory 702 and a large capacity non-volatile memory, such as a disk drive 703.

The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers.

The network computing device 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
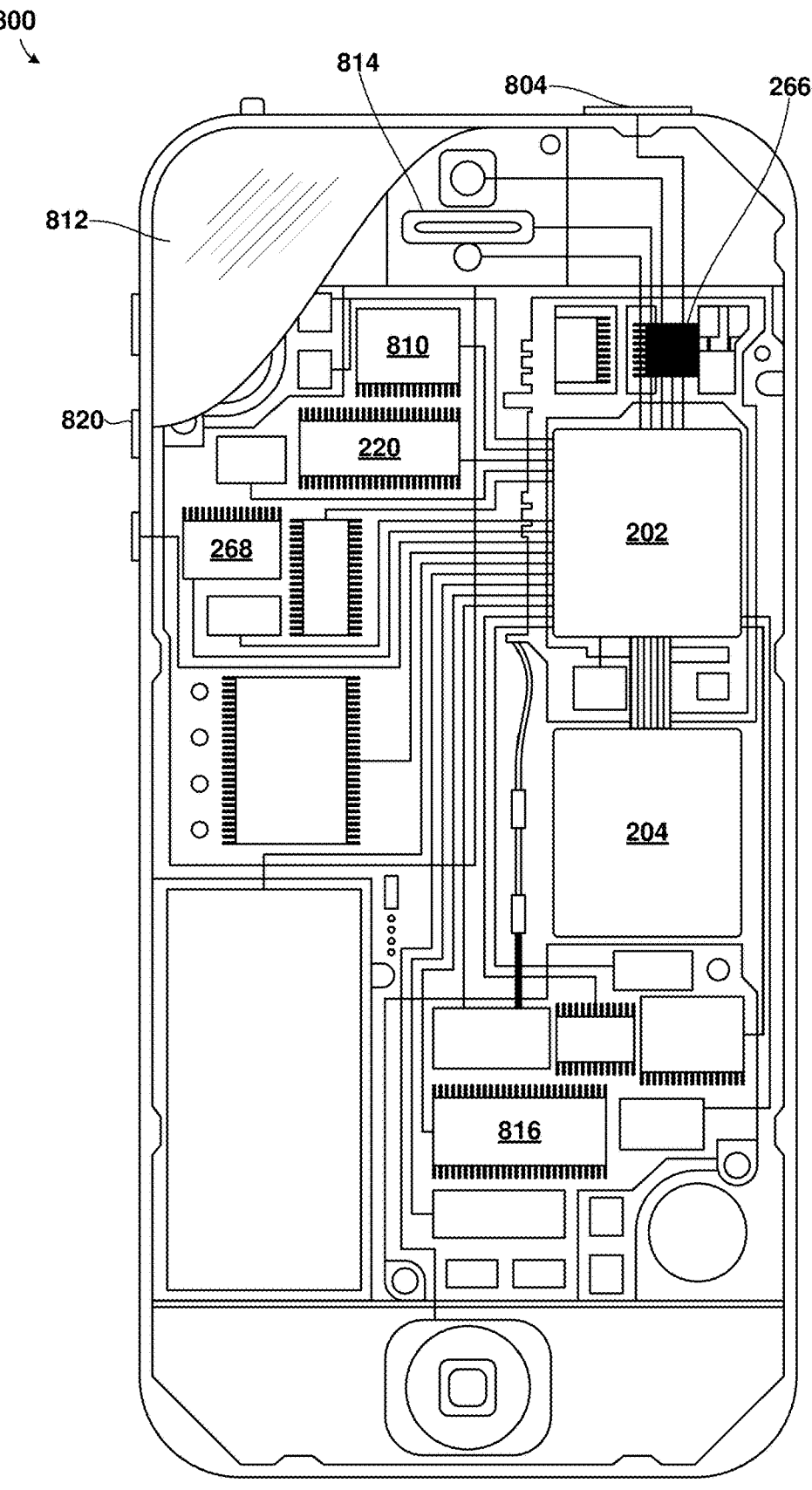
FIG. 8 is a component block diagram of a wireless device suitable for use with various embodiments.

FIG. 8 is a component block diagram of a wireless device 800 suitable for use with various embodiments. With reference to FIGS. 1-7, various embodiments may be implemented on a variety of wireless devices 800 (e.g., the wireless device 120a-120e, 200, 320, 120a-120e), an example of which is illustrated in FIG. 8 in the form of a smartphone. The wireless device 800 may include a first SOC 202 (e.g., a SOC-CPU) coupled to a second SOC 204 (e.g., a 5G capable SOC). The first and second SOCs 202, 204 may be coupled to internal memory 816, a display 812, and to a speaker 814. The first and second SOCs 202, 204 may also be coupled to at least one SIM 268 and/or a SIM interface that may store information supporting a first 5GNR subscription and a second 5GNR subscription, which support service on a 5G non-standalone (NSA) network.

The wireless device 800 may include an antenna 804 for sending and receiving electromagnetic radiation that may be connected to a wireless transceiver 266 coupled to one or more processors in the first and/or second SOCs 202, 204. The wireless device 800 may also include menu selection buttons or rocker switches 820 for receiving user inputs.

The wireless device 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 810 may include a digital signal processor (DSP) circuit (not shown separately).

The processors of the wireless network computing device 700 and the wireless device 800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 220, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdma-One, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting retransmission in a multicast session, comprising:
   receiving a Packet Data Convergence Protocol (PDCP) packet data unit (PDU) including a polling bit;
   generating a PDCP status report indicating at least a first missing count (FMC) of a next not received PDCP PDU for the multicast session in response to receiving the PDCP PDU including the polling bit, wherein:
   the PDCP PDU indicates that a PDCP status reporting condition for the multicast session has occurred, and
   the polling bit being included based on at least one of a threshold associated with a number of PDCP PDUs sent or a threshold associated with a number of bytes of the PDCP PDUs sent;
   sending the PDCP status report to a network entity, and
   receiving a retransmitted PDCP PDU from the network entity via a unicast transport channel or a multicast transport channel, a unicast radio link control (RLC) entity associated with the unicast transport channel and a multicast RLC entity associated with the multicast transport channel, wherein the retransmitted PDCP PDU corresponds to the next not received PDCP PDU.

2. The method of claim 1, wherein:
   the next not received PDCP PDU was scheduled to be received via the multicast transport channel; and
   the retransmitted PDCP PDU is received via the multicast transport channel.

3. The method of claim 1, wherein:
   the next not received PDCP PDU was scheduled to be received via the multicast transport channel; and
   the retransmitted PDCP PDU is received via the unicast transport channel.

4. The method of claim 1, further comprising:
   activating the unicast RLC entity associated with the unicast transport channel for a multicast radio bearer (MRB) of the multicast session and the multicast RLC entity associated with the multicast transport channel for the MRB of the multicast session.

5. The method of claim 4, further comprising:
   receiving, from the network entity, an indication to deactivate the unicast RLC entity or to deactivate the multicast RLC entity; and
   maintaining the unicast RLC entity or the multicast RLC entity indicated for deactivation in a suspended state.

6. The method of claim 4, wherein;
   the unicast RLC entity operates in an acknowledge mode (AM) or an unacknowledged mode (UM); and
   the multicast RLC entity operates in an UM or a transparent mode (TM).

7. The method of claim 1, further comprising:

activating the unicast RLC entity associated with the unicast transport channel for a multicast radio bearer (MRB) of the multicast session and the multicast RLC entity associated with the multicast transport channel for the MRB of the multicast session, wherein the multicast RLC entity operates in an acknowledge mode (AM);

configuring the multicast RLC entity with a first logical channel identifier (LCID) for multicast reception and a second LCID for unicast reception; and configuring the unicast RLC entity with a third LCID for unicast reception.

8. The method of claim 7, further comprising:

receiving packets for the multicast session from the network entity associated with the first LCID, wherein the packets are hybrid automatic repeat request (HARQ) encoded with the first LCID and a group-radio network temporary identifier (G-RNTI);

receiving packets for the multicast session from the network entity associated with the second LCID, wherein the packets are HARQ encoded with the second LCID and a cell-radio network temporary identifier (C-RNTI); or receiving packets for the multicast session from the network entity associated with the third LCID, wherein the packets are HARQ encoded with the third LCID and the C-RNTI.

9. The method of claim 1, further comprising:

activating the unicast RLC entity associated with the unicast transport channel for a multicast radio bearer (MRB) of the multicast session and the multicast RLC entity associated with the multicast transport channel for the MRB of the multicast session, wherein the multicast RLC entity operates in an unacknowledged mode (UM);

configuring the multicast RLC entity with a first logical channel identifier (LCID) for multicast reception; and configuring the unicast RLC entity with a second LCID for unicast reception.

10. The method of claim 9, further comprising:

receiving packets for the multicast session from the network entity associated with the first LCID, wherein the packets are hybrid automatic repeat request (HARQ) encoded with the first LCID and a group-radio network temporary identifier (G-RNTI); or receiving packets for the multicast session from the network entity associated with the second LCID, wherein the packets are HARQ encoded with the second LCID and a cell-radio network temporary identifier (C-RNTI).

11. The method of claim 1, further comprising:

activating the unicast RLC entity associated with the unicast transport channel for a multicast radio bearer (MRB) of the multicast session and the multicast RLC entity associated with the multicast transport channel for the MRB of the multicast session, wherein the multicast RLC entity operates in an acknowledge mode (AM) or an unacknowledged mode (UM) and the unicast RLC entity operations in an AM or a UM;

configuring the multicast RLC entity with a first logical channel identifier (LCID) for multicast reception; and configuring the unicast RLC entity with a second LCID for unicast reception.

12. The method of claim 11, further comprising one of:

receiving packets for the multicast session from the network entity associated with the first LCID, wherein the packets are hybrid automatic repeat request (HARQ) encoded with the first LCID and a group-radio network temporary identifier (G-RNTI) or the packets are HARQ encoded with the first LCID and a cell-radio network temporary identifier (C-RNTI); or receiving packets for the multicast session from the network entity associated with the second LCID, wherein the packets are HARQ encoded with the second LCID and the C-RNTI.

13. A wireless device, comprising:

one or more processors and one or more memories coupled with the one or more processors, the one or more processors configured to cause the wireless device to:

receive a Packet Data Convergence Protocol (PDCP) packet data unit (PDU) including a polling bit;

generate a PDCP status report indicating at least a first missing count (FMC) of a next not received PDCP PDU for a multicast session in response to receiving the PDCP PDU including the polling bit, wherein:

the PDCP PDU indicates that a PDCP status reporting condition for the multicast session has occurred, and the polling bit being included based on at least one of a threshold associated with a number of PDCP PDUs sent or a threshold associated with a number of bytes of the PDCP PDUs sent;

send the PDCP status report to a network entity, and receive a retransmitted PDCP PDU from the network entity via a unicast transport channel or a multicast transport channel, a unicast radio link control (RLC) entity associated with the unicast transport channel and a multicast RLC entity associated with the multicast transport channel, wherein the retransmitted PDCP PDU corresponds to the next not received PDCP PDU.

14. The wireless device of claim 13, wherein:

the next not received PDCP PDU was scheduled to be received via the multicast transport channel; and the retransmitted PDCP PDU is received via the multicast transport channel.

15. The wireless device of claim 13, wherein:

the next not received PDCP PDU was scheduled to be received via the multicast transport channel; and the retransmitted PDCP PDU is received via the unicast transport channel.

16. The wireless device of claim 13, wherein the one or more processors are configured to cause the wireless device to:

activate the unicast RLC entity associated with the unicast transport channel for a multicast radio bearer (MRB) of the multicast session and the multicast RLC entity associated with the multicast transport channel for the MRB of the multicast session.

17. The wireless device of claim 16, wherein the one or more processors are configured to cause the wireless device to:

receive, from the network entity, an indication to deactivate the unicast RLC entity or to deactivate the multicast RLC entity; and maintain the unicast RLC entity or the multicast RLC entity indicated for deactivation in a suspended state.

18. The wireless device of claim 13, wherein the one or more processors are configured to cause the wireless device to:

activate the unicast RLC entity associated with the unicast transport channel for a multicast radio bearer (MRB) of the multicast session and the multicast RLC entity associated with the multicast transport channel for the MRB of the multicast session, wherein the multicast RLC entity operates in an acknowledge mode (AM);

configure the multicast RLC entity with a first logical channel identifier (LCID) for multicast reception and a second LCID for unicast reception; and configure the unicast RLC entity with a third LCID for unicast reception.

19. The wireless device of claim 18, wherein the one or more processors are configured to cause the wireless device to:

receive packets for the multicast session from the network entity associated with the first LCID, wherein the packets are hybrid automatic repeat request (HARQ) encoded with the first LCID and a group-radio network temporary identifier (G-RNTI);

receive packets for the multicast session from the network entity associated with the second LCID, wherein the packets are HARQ encoded with the second LCID and a cell-radio network temporary identifier (C-RNTI); or receive packets for the multicast session from the network entity associated with the third LCID, wherein the packets are HARQ encoded with the third LCID and the C-RNTI.

20. The wireless device of claim 13, wherein the one or more processors are configured to cause the wireless device to:

activate the unicast RLC entity associated with the unicast transport channel for a multicast radio bearer (MRB) of the multicast session and the multicast RLC entity associated with the multicast transport channel for the MRB of the multicast session, wherein the multicast RLC entity operates in an unacknowledged mode (UM);

configure the multicast RLC entity with a first logical channel identifier (LCID) for multicast reception; and configure the unicast RLC entity with a second LCID for unicast reception.

21. The wireless device of claim 13, wherein the one or more processors are configured to cause the wireless device to:

activate the unicast RLC entity associated with the unicast transport channel for a multicast radio bearer (MRB) of the multicast session and the multicast RLC entity associated with the multicast transport channel for the MRB of the multicast session, wherein the multicast RLC entity operates in an acknowledge mode (AM) or an unacknowledged mode (UM) and the unicast RLC entity operations in an AM or a UM;

configure the multicast RLC entity with a first logical channel identifier (LCID) for multicast reception; and configure the unicast RLC entity with a second LCID for unicast reception.

22. One or more non-transitory processor-readable media having stored thereon processor-executable instructions that, when executed by one or more processors of a wireless device, cause the wireless device to perform operations comprising:

receiving a Packet Data Convergence Protocol (PDCP) packet data unit (PDU) including a polling bit;

generating a PDCP status report indicating at least a first missing count (FMC) of a next not received PDCP PDU for a multicast session in response to receiving the PDCP PDU including the polling bit, wherein:

the PDCP PDU indicates that a PDCP status reporting condition for the multicast session has occurred, and the polling bit being included based on at least one of a threshold associated with a number of PDCP PDUs sent or a threshold associated with a number of bytes of the PDCP PDUs sent;

sending the PDCP status report to a network entity, and receiving a retransmitted PDCP PDU from the network entity via a unicast transport channel or a multicast transport channel, a unicast radio link control (RLC) entity associated with the unicast transport channel and a multicast RLC entity associated with the multicast transport channel, wherein the retransmitted PDCP PDU corresponds to the next not received PDCP PDU.

* * * * *